United States Patent
Hata et al.

(10) Patent No.: US 12,017,434 B2
(45) Date of Patent: Jun. 25, 2024

(54) MULTILAYER STRUCTURE, METHOD FOR PRODUCING SAME, SHEET FOR PREVENTING DIFFUSION OF HAZARDOUS SUBSTANCES, LANDFILL GEOMEMBRANE, AND MULTILAYER PIPE

(71) Applicants: KURARAY CO., LTD., Okayama (JP); MITSUI CHEMICALS, INC., Tokyo (JP)

(72) Inventors: Kazuhira Hata, Kurashiki (JP); Tatsuya Oshita, Kurashiki (JP); Ryohei Shiga, Ichihara (JP)

(73) Assignees: KURARAY CO., LTD., Okayama (JP); MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 17/921,013

(22) PCT Filed: Apr. 13, 2021

(86) PCT No.: PCT/JP2021/015359
§ 371 (c)(1),
(2) Date: Oct. 24, 2022

(87) PCT Pub. No.: WO2021/215313
PCT Pub. Date: Oct. 28, 2021

(65) Prior Publication Data
US 2023/0158785 A1    May 25, 2023

(30) Foreign Application Priority Data
Apr. 24, 2020 (JP) .................... 2020-077745

(51) Int. Cl.
| | |
|---|---|
| B32B 27/08 | (2006.01) |
| B32B 1/08 | (2006.01) |
| B32B 7/02 | (2019.01) |
| B32B 27/30 | (2006.01) |
| B32B 27/32 | (2006.01) |

(52) U.S. Cl.
CPC .............. B32B 27/08 (2013.01); B32B 1/08 (2013.01); B32B 7/02 (2013.01); B32B 27/306 (2013.01); B32B 27/32 (2013.01); B32B 2250/246 (2013.01); B32B 2250/40 (2013.01); B32B 2307/732 (2013.01); B32B 2597/00 (2013.01)

(58) Field of Classification Search
CPC ......... B32B 27/08; B32B 1/08; B32B 27/306; B32B 27/32; B32B 2250/246; B32B 2250/40; B32B 2307/732; B32B 2597/00
See application file for complete search history.

(56) References Cited

U.S. PATENT DOCUMENTS

| | | |
|---|---|---|
| 7,683,135 B2 | 3/2010 | Uchiumi et al. |
| 9,511,567 B2 | 12/2016 | Hu et al. |
| 2007/0106031 A1 | 5/2007 | Uchiumi et al. |
| 2008/0003390 A1 | 1/2008 | Hayashi et al. |
| 2015/0217544 A1 | 8/2015 | Hu et al. |
| 2018/0334593 A1 | 11/2018 | Shiga et al. |
| 2019/0292359 A1 | 9/2019 | Inoue et al. |
| 2020/0230934 A1 | 7/2020 | Yamasaki et al. |
| 2021/0001608 A1 | 1/2021 | Ishiuchi et al. |
| 2022/0081598 A1 | 3/2022 | Iwashita et al. |

FOREIGN PATENT DOCUMENTS

| | | |
|---|---|---|
| JP | H06-322024 A | 11/1994 |
| JP | H07-053812 A | 2/1995 |
| JP | 2006-249392 A | 9/2006 |
| JP | 2007-283582 A | 11/2007 |
| JP | 2012-041076 A | 3/2012 |
| JP | 2012-106494 A | 6/2012 |
| JP | 2015-531324 A | 11/2015 |
| JP | 2018-145396 A | 9/2018 |
| WO | 2004/092234 A1 | 10/2004 |
| WO | 2005/105437 A1 | 11/2005 |
| WO | 2017/104731 A1 | 6/2017 |
| WO | 2018/155448 A1 | 8/2018 |
| WO | 2019/194318 A1 | 10/2019 |
| WO | 2020/145239 A1 | 7/2020 |

OTHER PUBLICATIONS

English machine translation for JP2007-283582. (Year: 2007).*
International Search Report issued in corresponding International Patent Application No. PCT/JP2021/015359 dated Jun. 29, 2021.
International Preliminary Report on Patentability and Written Opinion issued in corresponding International Patent Application No. PCT/JP2021/015359 dated Nov. 3, 2022.

* cited by examiner

*Primary Examiner* — Michael C Miggins
(74) *Attorney, Agent, or Firm* — Morgan, Lewis & Bockius LLP

(57) ABSTRACT

Provided are: a multilayer structure having a strong initial interlayer adhesive force, with a decrease of the interlayer adhesive force being prevented even in a case of use in a harsh environment such as exposure to hot water, an acid, or an alkali for a long period of time; a method for producing such a multilayer structure; and a sheet for preventing diffusion of hazardous substances, a landfill geomembrane, and a multilayer pipe, each including such a multilayer structure.

18 Claims, No Drawings

MULTILAYER STRUCTURE, METHOD FOR PRODUCING SAME, SHEET FOR PREVENTING DIFFUSION OF HAZARDOUS SUBSTANCES, LANDFILL GEOMEMBRANE, AND MULTILAYER PIPE

TECHNICAL FIELD

The present invention relates to a multilayer structure, a method for producing the same, a sheet for preventing diffusion of hazardous substances, a landfill geomembrane, and a multilayer pipe.

BACKGROUND ART

Multilayer structures having layers of an ethylene-vinyl alcohol copolymer (hereinafter, may be abbreviated as "EVOH") are used for various purposes, involving packaging materials, containers, sheets, pipes, and the like, taking advantage of superior barrier properties, etc., thereof. As such multilayer structures, a widely known multilayer structure include an EVOH layer and a polyolefin layer, being laminated via a carboxylic acid-modified polyolefin layer as an adhesive layer (see Patent Document 1).

PRIOR ART DOCUMENTS

Patent Documents

Patent Document 1: PCT International Publication No. 2005/105437

SUMMARY OF THE INVENTION

Problems to be Solved by the Invention

In a conventional multilayer structure having an EVOH layer, there may be a case in which interfacial peeling occurs due to decreased interlayer adhesive force, in a case of use in a harsh environment such as exposure to hot water, a high temperature, high humidity, an acid, or an alkali over a long period of time. The interfacial peeling in the multilayer structure is not preferred since it causes deterioration of barrier properties, and the like. In this respect, further improvements of performance such as interlayer adhesive force and durability thereof are desired for conventional multilayer structures having the EVOH layer.

The present invention was made in view of the foregoing circumstances, and an object of the present invention is to provide: a multilayer structure which includes an EVOH layer, and has a strong initial interlayer adhesive force, with a decrease of the interlayer adhesive force being prevented even in a case of use of the multilayer structure in a harsh environment such as exposure to hot water, an acid, or an alkali for a long period of time; a method for producing such a multilayer structure; and a sheet for preventing diffusion of hazardous substances, a landfill geomembrane, and a multilayer pipe, each including such a multilayer structure.

Means for Solving the Problems

According to the present invention, the object described above is accomplished by providing the following items.

1) A multilayer structure including: one or a plurality of layer (A) constituted from a resin composition (A) containing an ethylene-vinyl alcohol copolymer (a) as a principal component; and one or a plurality of layer (B) constituted from a resin composition (B) containing a modified polyolefin (b) which has a basic nitrogen-containing group, wherein at least one of the layer (A) and at least one of the layer (B) are directly laminated, the ethylene-vinyl alcohol copolymer (a) has at least one of a carboxy group and a lactone ring, and a total amount of the carboxy group and the lactone ring with respect to a total amount of an ethylene unit, a vinyl alcohol unit, and a vinyl ester unit of the ethylene-vinyl alcohol copolymer (a) is 0.08 mol % or more and 0.4 mol % or less.

2) The multilayer structure according to item (1), wherein the basic nitrogen-containing group includes at least one of an amino group and an imino group.

3) The multilayer structure according to item (2), wherein the basic nitrogen-containing group includes an imino group.

4) The multilayer structure according to any one of items (1) to (3), further including one or a plurality of layer (C) constituted from a resin composition (C) containing, as a principal component, a polyolefin (c) which does not substantially have a basic nitrogen-containing group.

5) The multilayer structure according to any one of items (1) to (4), further including one or a plurality of layer (D) constituted from a resin composition (D) containing: an ethylene-vinyl alcohol copolymer (a') which has at least one of a carboxy group and a lactone ring; and a modified polyolefin (b') which has a basic nitrogen-containing group.

6) The multilayer structure according to any one of items (1) to (5), including a three-layer structure including the layer (B), the layer (A), and the layer (B), being directly laminated in this order.

7) The multilayer structure according to any one of items (1) to (3), including a five-layer structure including a layer (X), the layer (B), the layer (A), the layer (B), and the layer (X), being directly laminated in this order, wherein two layers (X) are each independently: a layer (C) constituted from a resin composition (C) containing, as a principal component, a polyolefin (c) which does not substantially have a basic nitrogen-containing group; or a layer (D) constituted from a resin composition (D) containing: an ethylene-vinyl alcohol copolymer (a') which has at least one of a carboxy group and a lactone ring; and a modified polyolefin (b') which has a basic nitrogen-containing group.

8) The multilayer structure according to any one of items (1) to (7), wherein a total average thickness of the one or a plurality of layer (A) is 30 μm or more, a total average thickness of the one or a plurality of layer (B) is 50 μm or more, and a total average thickness of the multilayer structure is 750 μm or more.

9) A sheet for preventing diffusion of hazardous substances, the sheet including the multilayer structure according to any one of items (1) to (8).

10) A landfill geomembrane including the multilayer structure according to any one of items (1) to (8).

11) A multilayer pipe including the multilayer structure according to any one of items (1) to (8).

12) A method for producing a multilayer structure, the method including coextruding using: a resin composition (A) containing an ethylene-vinyl alcohol copolymer (a) as a principal component; and a resin composition (B) containing a modified polyolefin (b) which has a basic nitrogen-containing group, such that at least one layer (A) formed from the resin composition (A)

and at least one layer (B) formed from the resin composition (B) are directly laminated, wherein the ethylene-vinyl alcohol copolymer (a) has at least one of a carboxy group and a lactone ring, and a total amount of the carboxy group and the lactone ring with respect to a total amount of an ethylene unit, a vinyl alcohol unit, and a vinyl ester unit of the ethylene-vinyl alcohol copolymer (a) is 0.08 mol % or more and 0.4 mol % or less.

Effects of the Invention

Provided according to aspects of the present invention are: a multilayer structure which includes an EVOH layer, and has a strong initial interlayer adhesive force, with a decrease of the interlayer adhesive force being prevented even in a case of use of the multilayer structure in a harsh environment such as exposure to hot water, an acid, or an alkali for a long period of time; a method for producing such a multilayer structure; and a sheet for preventing diffusion of hazardous substances, a landfill geomembrane, and a multilayer pipe, each including such a multilayer structure.

DESCRIPTION OF EMBODIMENTS

Multilayer Structure

The multilayer structure of one embodiment of the present invention includes: one or a plurality of layer (A) constituted from a resin composition (A) containing an ethylene-vinyl alcohol copolymer (a) (hereinafter, may be abbreviated as "EVOH (a)") as a principal component; and one or a plurality of layer (B) constituted from a resin composition (B) containing a modified polyolefin (b) which has a basic nitrogen-containing group. At least one layer (A) of the one or a plurality of layer (A), and at least one layer (B) of the one or a plurality of layer (B) are directly laminated. The EVOH (a) has at least one of a carboxy group and a lactone ring. In the EVOH (a), a total amount of the carboxy group and the lactone ring with respect to a total amount of an ethylene unit, a vinyl alcohol unit, and a vinyl ester unit of the EVOH (a) is 0.08 mol % or more and 0.4 mol % or less.

The multilayer structure of the one embodiment of the present invention has a strong initial interlayer adhesive force, with a decrease of the interlayer adhesive force being prevented even in a case of use in a harsh environment such as exposure to hot water, an acid, or an alkali for a long period of time. Although the reasons for achieving such effects are not clarified, it is speculated as follows. In conventional multilayer structures having EVOH layers, with a carboxylic acid-modified polyolefin being used as an adhesive, it is considered that adhesion occurs due to an ester bond and a hydrogen bond, both being formed between layers by a hydroxy group of the EVOH, and a carboxy group of the carboxylic acid-modified polyolefin. However, it is speculated that in a case in which such a multilayer structure is exposed to hot water, an acid, or an alkali, the adhesive force is decreased, resulting due to, e.g., hydrolysis of the ester bond being caused. To the contrary, in the multilayer structure according to the one embodiment of the present invention, it is considered that the at least one of a carboxy group and a lactone ring included in the EVOH (a), and the basic nitrogen-containing group included in the modified polyolefin (b) form between layers, a chemical bond, such as an amide bond, having relatively high resistance to hydrolysis. Thus, it is speculated that the multilayer structure has a strong initial interlayer adhesive force, and even in the case of use in a harsh environment such as exposure to hot water, a high temperature, high humidity, an acid, or an alkali for a long period of time, a decrease of the interlayer adhesive force is prevented, whereby interlayer peeling becomes less likely to occur.

Layer (A)

The layer (A) is a layer constituted from the resin composition (A) containing the EVOH (a) as a principal component. It is to be noted that the "principal component" as referred to means a component, a content of which on a mass basis is the highest. The same applies to each principal component below. In a case in which there exist a plurality of number of layers (A), the EVOH (a) of each resin composition (A) constituting each layer (A) may be identical or different, and besides, formulation of each resin composition (A) constituting each layer (A) may be also identical or different. In light of productivity and the like, the formulation of each resin composition (A) of the plurality of layers (A) is preferably identical.

As referred to herein, the "resin composition" may be constituted from one type of component, or may be constituted from two or more types of components. For example, the resin composition (A) may be constituted from the EVOH (a) alone. In other words, the "resin composition" may be referred to as merely "a resin" or "a resinous material" irrespective of the number of components constituting the resin composition. The same applies to each of all the "resin compositions" referred to herein.

The upper limit of the number of layer(s) of the layer (A) may be, for example, 100, or may be 10, 5, 3, or 2. The number of the layer(s) of the layer (A) is preferably one, as the case may be.

EVOH (a)

The EVOH (a) is a copolymer having an ethylene unit and a vinyl alcohol unit. The EVOH (a) is typically obtained by a saponification reaction of an ethylene-vinyl ester copolymer. Thus, the EVOH (A) may further have a remaining vinyl ester unit. In other words, the EVOH (a) is a copolymer which has the ethylene unit and the vinyl alcohol unit, and which further has or does not have the vinyl ester unit as an optional monomer unit.

The EVOH (a) has at least one of a carboxy group and a lactone ring. It is to be noted that a part or all of the carboxy group(s) may be present in a state of salt(s). The number of ring atoms of the lactone ring is not particularly limited, and for example, the lactone ring may be a 4 to 6-membered ring, and is preferably a 5-membered ring. The carboxy group and the lactone ring involved may be in a state of forming a chemical bond with a group in a component of an other layer, at the interface of these layers. The carboxy group and the lactone ring are preferably present at the end portion of the EVOH (a). Also, the carboxy group and the lactone ring preferably bond to a methylene group (—CH$_2$—). The carboxy group may be present at the end of the EVOH (a) as a unit including a carboxy group represented by the following formula (I), for example. The lactone ring may be present at the end of the EVOH (a) as a unit including a lactone ring represented by the following formula (II), for example.

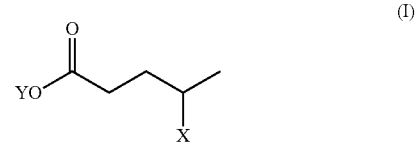

(I)

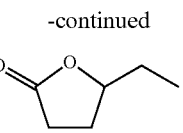 (II)

In the formula (I), X represents a hydrogen atom, a hydroxy group, or an esterified hydroxy group; and Y represents a hydrogen atom or an alkali metal.

The lower limit of a total amount (content) of the carboxy group and the lactone ring in the EVOH (a), with respect to a total amount (content) of an ethylene unit, a vinyl alcohol unit, and a vinyl ester unit of the EVOH (a), is preferably 0.08 mol %, more preferably 0.10 mol %, still more preferably 0.12 mol %, even more preferably 0.14 mol %, and particularly preferably 0.18 mol %. When the total amount of the carboxy group and the lactone ring is equal to or more than the lower limit, the modified polyolefin (b) and the basic nitrogen-containing group can sufficiently bond, whereby the interlayer adhesive force and durability thereof can be increased.

On the other hand, the upper limit of the total amount (content) of the carboxy group and the lactone ring in the EVOH (a), with respect to the total amount of the ethylene unit, the vinyl alcohol unit, and the vinyl ester unit of the EVOH (a), is 0.4 mol % and preferably 0.3 mol %, and may be more preferably 0.25 mol %. When the total amount of the carboxy group and the lactone ring is too high, thermal stability may deteriorate. Specifically, the carboxy group and the lactone ring can lead to a branched polymer having a high degree of polymerization through a reaction with a hydroxy group of the EVOH (a) at a high temperature. Thus, a greater content of the carboxy group and the lactone ring tends to decrease melt moldability of the EVOH (a). Therefore, the total amount of the carboxy group and the lactone ring being equal to or less than the upper limit may serve to maintain favorable melt moldability and to enable even film formation, whereby the interlayer adhesive force can be increased.

The lower limit of an amount (content) of the lactone ring in the EVOH (a), with respect to the total amount (content) of the ethylene unit, the vinyl alcohol unit, and the vinyl ester unit of the EVOH (a) is preferably 0.04 mol %, more preferably 0.07 mol %, and still more preferably 0.09 mol %. When the amount of the lactone ring is equal to or more than the lower limit, bond formation of the EVOH (a) and the basic nitrogen-containing group of the modified polyolefin (b) is promoted, whereby the interlayer adhesive force and durability thereof can be increased.

The upper limit of the amount (content) of the lactone ring in the EVOH (a), with respect to the total amount (content) of the ethylene unit, the vinyl alcohol unit, and the vinyl ester unit of the EVOH (a) is preferably 0.20 mol %, more preferably 0.18 mol %, still more preferably 0.15 mol %, and even more preferably 0.14 mol %. The lactone ring promotes a reaction with the hydroxy group of the EVOH (a) at a high temperature and can lead to a branched polymer having a high degree of polymerization. Thus, a greater content of the lactone ring tends to decrease melt moldability of the EVOH (a). The amount of the lactone ring being equal to or less than the upper limit may serve to maintain favorable melt moldability and to enable even film formation, whereby the interlayer adhesive force can be increased.

The total amount (content) of the carboxy group and the lactone ring, and the amount (content) of the lactone ring, each with respect to the total amount (content) of the ethylene unit, the vinyl alcohol unit, and the vinyl ester unit in the EVOH (a) may be determined by, for example, a $^1$H-NMR measurement.

The production and saponification of the ethylene-vinyl ester copolymer being a precursor of the EVOH (a) may be performed in accordance with a well-known procedure. The vinyl ester is typified by vinyl acetate, but may be another fatty acid vinyl ester such as vinyl formate, vinyl propionate, vinyl valerate, vinyl caprate, vinyl laurate, vinyl stearate, vinyl pivalate, vinyl versatate, or the like.

A polymerization procedure for copolymerizing ethylene and a vinyl ester in producing an ethylene-vinyl ester copolymer that is a precursor of the EVOH (a) may be any one of batch polymerization, semi-batch polymerization, continuous polymerization, and semi-continuous polymerization. Moreover, as a polymerization procedure, a well-known process such as a bulk polymerization process, a solution polymerization process, a suspension polymerization process, or an emulsion polymerization process may be adopted. Typically, the bulk polymerization process or the solution polymerization process is adopted in which polymerization is allowed to proceed in the absence of a solvent or in a solvent such as an alcohol. In a case in which an ethylene-vinyl ester copolymer having a high degree of polymerization is to be obtained, adopting the emulsion polymerization process may be one option.

The solvent used in the solution polymerization process is not particularly limited, and an alcohol is suitably used and, for example, a lower alcohol such as methanol, ethanol, or propanol is more suitably used. The amount of the solvent used in a polymerization reaction liquid may be selected taking into consideration a viscosity average degree of polymerization of the ethylene-vinyl alcohol copolymer intended, as well as chain transfer of the solvent, and a mass ratio (solvent/total monomer) of the solvent contained in the reaction liquid to total monomers is selected from a range of 0.005 to 10, more preferably 0.01 to 1, and still more preferably 0.03 to 0.5.

A polymerization initiator used when the copolymerization of ethylene and the vinyl ester is conducted is selected from well-known polymerization initiators such as, e.g., an azo type initiator, a peroxide type initiator, and a redox type initiator, depending on the polymerization procedure. Examples of the azo type initiator include 2,2'-azobisisobutyronitrile, 2,2'-azobis(2,4-dimethylvaleronitrile), and 2,2'-azobis(4-methoxy-2,4-dimethylvaleronitrile). Examples of the peroxide type initiator include: percarbonate-based compounds such as diisopropyl peroxydicarbonate, di-2-ethylhexyl peroxydicarbonate, and diethoxyethyl peroxydicarbonate; perester compounds such as t-butyl peroxyneodecanate, α-cumyl peroxyneodecanate, and acetyl peroxide; acetylcyclohexylsulfonyl peroxide; 2,4,4-trimethylpentyl 2-peroxyphenoxyacetate; and the like. Potassium persufate, ammonium persulfate, hydrogen peroxide or the like may be used in combination with the initiator described above. The redox type initiator is a polymerization initiator prepared by combining, for example, the peroxide type initiator with a reducing agent such as sodium bisulfite, sodium bicarbonate, tartaric acid, L-ascorbic acid, or Rongalit. Although the amount of the polymerization initiator used cannot be generally predetermined since the amount may vary depending on the polymerization initiator, the amount is adjusted depending on a polymerization rate. The amount of the polymerization initiator used is, with respect to a vinyl ester monomer, preferably 0.01 to 0.2 mol %, and more preferably 0.02 to 0.15 mol %. The polymerization temperature is not particularly limited, but an appropriate temperature is from room temperature to about 150° C., and a preferred temperature is 40° C. or higher and a boiling point of the solvent used or lower.

In the copolymerization of ethylene and the vinyl ester, within a range not leading to inhibition of the effects of the present invention, the copolymerization may be carried out in the presence of a chain transfer agent. Examples of the chain transfer agent include: aldehydes such as acetaldehyde and propionaldehyde; ketones such as acetone and methyl ethyl ketone; mercaptans such as 2-hydroxyethanethiol; phosphinic acid salts such as sodium phosphinate monohydrate; and the like. In particular, aldehydes and ketones may be suitably used. The amount of the chain transfer agent added to the polymerization reaction liquid may be predetermined depending on the chain transfer coefficient of the chain transfer agent, and a degree of polymerization of the ethylene-vinyl ester copolymer intended, but in general, the amount of the chain transfer agent with respect to 100 parts by mass of the vinyl ester monomer is preferably 0.1 to 10 parts by mass.

In saponification of the ethylene-vinyl ester copolymer, a vinyl ester unit in the copolymer is converted into a vinyl alcohol unit. Furthermore, in a case in which the ethylene-vinyl ester copolymer has a plurality of ester groups of different types, a saponification reaction carried out once may enable different types of the ester groups to be hydrolyzed simultaneously.

The saponification reaction is conducted in, typically, an alcohol or a hydrous alcohol. In this reaction, a suitably used alcohol is a lower alcohol such as methanol or ethanol, and a particularly preferably used alcohol is methanol. The alcohol or the hydrous alcohol for use in the saponification reaction may contain another solvent such as acetone, methyl acetate, ethyl acetate, or benzene as long as a content thereof is, for example, 40% by mass or less of the mass of the alcohol or hydrous alcohol. A catalyst for use in the saponification is exemplified by an alkali metal hydroxide such as potassium hydroxide or sodium hydroxide, an alkali catalyst such as sodium methylate, and an acid catalyst such as a mineral acid. A temperature at which the saponification is conducted is not limited, and suitably falls within a range of 20 to 120° C. In a case in which a gelatinous product emerges to deposit as the saponification proceeds, the product may be pulverized and then washed and dried to give the ethylene-vinyl alcohol copolymer.

When ethylene and the vinyl ester are copolymerized, the ethylene-vinyl ester copolymer obtained may have a carboxy group or a lactone ring, particularly at the end of the copolymer, due to a side reaction. Thus, the content of the carboxy group and the lactone ring in the EVOH (a) can be regulated by polymerization conditions of the copolymerization of ethylene and the vinyl ester. For example, a higher polymerization temperature and/or rate of polymerization tends to result in increased contents of the carboxy group and the lactone ring. Therefore, the polymerization temperature is preferably 20° C. or higher and 90° C. or lower, and more preferably 50° C. or higher and 80° C. or lower. Furthermore, the rate of polymerization on the basis of the vinyl ester is preferably 10% or more and 70% or less, and more preferably 40% or more and 60% or less. In addition, together with the regulation of the polymerization temperature and the rate of polymerization, the regulation is also enabled by way of the type and/or the amount of the solvent used for the polymerization, and the type and/or the amount of the polymerization initiator used.

The content of the lactone ring in the EVOH (a) can be regulated by the polymerization temperature, as well as the type and the amount of the polymerization initiator used, the drying temperature, and the like. For example, even if the total content of the carboxy group and the lactone ring in the EVOH (a) are substantially equal, the content of the lactone ring tends to be low in a case of the drying temperature being lower. In light of an increase in the content of the lactone ring, the drying is conducted at a temperature of, for example, 80° C. or higher, and preferably 90° C. or 100° C. or higher. The upper limit of the temperature in the drying may be, for example, 150° C. In addition, for example, in a case in which 2,2'-azobisisobutyronitrile is used as the polymerization initiator, the content of the lactone ring tends to comparatively increase.

Moreover, in the copolymerization reaction of ethylene and the vinyl ester, the carboxy group can be introduced into the EVOH by: a procedure of adding a mercapto group-containing carboxylic acid such as 3-mercaptopropionic acid; a procedure of adding as a monomer, an unsaturated acid such as acrylic acid, methacrylic acid, crotonic acid, or itaconic acid, or an anhydride thereof; or the like. Alternatively, the content of the carboxy group and the lactone ring can be also regulated by: a procedure of subjecting the EVOH obtained after the saponification to an oxidization treatment with an oxidizing agent such as hydrogen peroxide; a procedure of subjecting the EVOH to a reduction treatment with a reducing agent such as hydrogenated aluminum lithium; or the like.

The lower limit of an ethylene unit content of the EVOH (a) is preferably 10 mol %, more preferably 15 mol %, still more preferably 20 mol %, and particularly preferably 25 mol %. On the other hand, the upper limit of the ethylene unit content of the EVOH (a) is preferably 60 mol %, more preferably 50 mol %, and still more preferably 45 mol %. When the ethylene unit content is equal to or more than the lower limit, the thermal stability tends to improve. Furthermore, when the ethylene unit content is equal to or less than the upper limit, barrier properties and/or melt tension tend(s) to improve.

The lower limit of the degree of saponification of the EVOH (a) is preferably 95 mol %, more preferably 98 mol %, and still more preferably 99.9 mol %. When the degree of saponification of the EVOH (A) is equal to or more than the lower limit, barrier properties, thermal stability, moisture resistance, and the like of the multilayer structure tend to be favorable. Moreover, the degree of saponification may be 100 mol % or less, 99.97 mol % or less, or 99.94 mol % or less.

The EVOH (a) may further include, within a range not leading to impairment of the effects of the present invention, other monomer unit(s) aside from the ethylene unit, the vinyl alcohol unit, the vinyl ester unit, the unit including a carboxy group, and the unit including a lactone ring. The content of the other monomer unit(s), with respect to the total amount of the ethylene unit, the vinyl alcohol unit, and the vinyl ester unit, is preferably 10 mol % or less, more preferably 5 mol % or less, and still more preferably 1 mol % or less. Furthermore, the content of the other monomer unit may be 0.05 mol % or more, or may be 0.1 mol % or more.

Examples of a monomer that gives the other monomer unit(s) include: nitriles such as acrylonitrile and methacrylonitrile; amides such as acrylamide and methacrylamide; olefin sulfonic acids such as vinylsulfonic acid, allylsulfonic acid, and methallylsulfonic acid, and salts thereof; vinylsilane compounds such as vinyltrimethoxysilane, vinyltriethoxysilane, vinyltri(β-methoxy-ethoxy)silane, and γ-methacryloxypropylmethoxysilane; alkyl vinyl ethers; vinyl ketone; N-vinylpyrrolidone; vinyl chloride; vinylidene chloride; 2-methylene-1,3-propanediol diacetate; 2-methylene-1,3-propanediol dipropionate, 2-methylene-1,3-propanediol dibutyrate; and the like.

The EVOH (a) may be used either alone of one type, or two or more types thereof may be used in combination.

The lower limit of the content of the EVOH (a) in the resin composition (A) is preferably 80% by mass, more preferably 90% by mass, still more preferably 95% by mass, and may be particularly preferably 97% by mass, 98% by mass, or 99% by mass. On the other hand, the upper limit of the content of the EVOH (a) may be 100% by mass, or may be 99.9% by mass, 99% by mass, 98% by mass, 97% by mass, or 95% by mass.

Other Component(s)

The resin composition (A) may contain other component(s) such as: a resin other than the EVOH (a); a metal salt; an acid, a boron compound; an antioxidant; a plasticizer; a filler; an antiblocking agent; a lubricant; a stabilizer; a surfactant; a coloring material; an ultraviolet ray-absorbing agent; an antistatic agent; a drying agent; a crosslinking agent; and a reinforcing agent. Of these, in light of thermal stability and adhesiveness, the resin composition (A) preferably contains at least one of the metal salt and the acid.

In light of further enhancing the interlayer adhesiveness, the metal salt is preferably an alkali metal salt, and in light of the thermal stability, the metal salt is preferably an alkaline earth metal salt. In the case in which the resin composition (A) contains such a metal salt, a content is, in terms of metal atoms of the metal salt, preferably 1 ppm or more, more preferably 5 ppm or more, still more preferably 10 ppm or more, and particularly preferably 20 ppm or more. Also, the content of the metal salt is, in terms of metal atoms of the metal salt, preferably 10,000 ppm or less, more preferably 5,000 ppm or less, still more preferably 1,000 ppm or less, and particularly preferably 500 ppm or less. When the content of the metal salt falls within the above range, the thermal stability tends to be favorable while the interlayer adhesiveness being favorable is maintained.

The acid is preferably a carboxylic acid and/or a phosphoric acid, in light of improvement of thermal stability in melt molding. In the case in which the resin composition (A) contains the carboxylic acid, a content of the carboxylic acid is preferably 1 ppm or more, more preferably 10 ppm or more, and still more preferably 50 ppm or more. Moreover, the content of the carboxylic acid is preferably 10,000 ppm or less, more preferably 1,000 ppm or less, and still more preferably 500 ppm or less. In the case in which the resin composition (A) contains the phosphoric acid, a content of the phosphoric acid is, in terms of a phosphate radical equivalent, preferably 0.5 ppm or more, more preferably 5 ppm or more, and still more preferably 20 ppm or more. On the other hand, the content of phosphoric acid compounds is preferably 10,000 ppm or less, more preferably 300 ppm or less, and still more preferably 150 ppm or less. When the resin composition (A) contains the carboxylic acid and the phosphoric acid within the above range, the thermal stability in melt molding tends to be favorable.

Examples of the boron compound include: boric acids such as orthoboric acid, metaboric acid, and tetraboric acid; boric acid esters such as triethyl borate and trimethyl borate; boric acid salts such as alkali metal salts or alkaline earth metal salts of the boric acids, and borax; borohydrides; and the like. Of these, in light of the thermal stability of the resin composition (A), boric acids are preferred, and orthoboric acid (hereinafter, may be also referred to as "boric acid") is more preferred. In the case in which the resin composition (A) contains the boron compound, the content thereof is preferably 1 ppm or more, more preferably 10 ppm or more, and still more preferably 50 ppm or more. In addition, the content of the boron compound is preferably 2,000 ppm or less, more preferably 1,000 ppm or less, and still more preferably 500 ppm or less. When the content of the boron compound falls within the above range, thermal stability in melt molding tends to be favorable.

In light of prevention from decline in the strength particularly during outdoor use, it is also preferred that the resin composition (A) further contains an antioxidant. The type of the antioxidant is not particularly limited, but a compound having a hindered phenol group, and a compound having a hindered amine group are preferred, and a commercially available product which can be industrially produced may be used ad libitum. The content of the antioxidant, with respect to 100 parts by mass of the EVOH (a), is preferably 0.01 parts by mass or more and 5 parts by mass or less, and more preferably 0.1 parts by mass or more and 3 parts by mass or less.

The upper limit of the content of component(s) other than the EVOH (a), the metal salt, the acid, the boron compound, and the antioxidant in the resin composition (A) is preferably 10% by mass, and may be 1% by mass, 0.1% by mass, 0.01% by mass, or 0.001% by mass.

Thickness, Etc.

The thickness of the layer (A) is not particularly limited, and the lower limit of the average thickness of one layer (A) may be, for example, 1 μm, and is preferably 10 μm, more preferably 30 μm, and may be still more preferably 40 μm, 50 μm, or 60 μm. Furthermore, the lower limit of the total average thickness of the one or a plurality of layer (A) may be, for example, 1 μm, and is preferably 10 μm, more preferably 30 μm, and may be still more preferably 40 μm, 50 μm, or 60 μm. By virtue of the layer (A) being comparatively thickened, in addition to merely increasing the barrier properties and the like, the adhesiveness and durability thereof tend to improve. Although the reasons for these are not certain, it is speculated that, for example, in a case in which the multilayer structure is produced by melt molding such as coextrusion, thickened layers may lead to gradual lowering of the temperature during and after the film formation, whereby an interlayer binding reaction in these time periods can be more likely to proceed. It is to be noted that the average thickness of the layer is defined as an averaged value of thicknesses measured at arbitrary ten points. In the following, the same applies to the average thickness of the layer and the multilayer structure in total.

The upper limit of the average thickness of one layer (A) is, for example, preferably 300 μm and more preferably 200 μm, and may be still more preferably 100 μm. Moreover, the upper limit of the total average thickness of the one or a plurality of layer (A) is, for example, preferably 300 μm and more preferably 200 μm, and may be still more preferably 130 μm or 100 μm. When the average thickness of one layer (A) or total layers (A) is equal to or less than the upper limit, flexibility, handleability and the like can be improved, and reduction in thickness can be realized. Additionally, when the average thickness of one layer (A) or total layers (A) is equal to or less than the upper limit, the interlayer adhesive force and durability thereof may be improved, which may result from improved flexibility.

The layer (A) may be formed by melt molding or the like using the resin composition (A) containing the EVOH (a). The lower limit of a melt flow rate of the resin composition (A) is preferably 0.1 g/10 min, more preferably 0.5 g/10 min, and still more preferably 0.8 g/10 min. On the other hand, the upper limit of the melt flow rate is preferably 30 g/10 min, more preferably 20 g/10 min, and still more preferably 15 g/10 min, and may be even more preferably 10 g/10 min or 5 g/10 min. When the melt flow rate of the resin composition (A) falls within the above range, moldability and appearance characteristics, etc., may improve. The melt flow rate of the resin composition (A) is defined as a value measured in accordance with ASTM D1238 under a condition involving a temperature of 190° C. and a load of 2,160 g. However, in the case of a subject having a melting point of around 190° C. or exceeding 190° C., the melt flow rate of the resin composition (A) is defined as a value determined by: measuring in accordance with ASTM D1238 under conditions involving a load of 2,160 g and a plurality of temperatures that are equal to or higher than the melting point; plotting thus obtained values on a semi-log graph with the abscissa representing reciprocal numbers of absolute temperatures, and with the ordinate (logarithmic scale) representing the melt flow rates; and extrapolating to 190° C.

Layer (B)

The layer (B) is constituted from the resin composition (B) containing the modified polyolefin (b). In a case in which there exists a plurality of number of layers (B), the modified polyolefin (b) of each resin composition (B) constituting each layer (B) may be identical or different, and in addition, the formulation of each resin composition (B) constituting each layer (B) may be also identical or different. In light of productivity and the like, it may be preferred that the formulation of each resin composition (B) constituting a plurality of layers (B) is identical.

The upper limit of the number of layer(s) of the layer (B) may be, for example, 200, or may be 20, 10, 6, or 4. Although the lower limit of the number of the layer(s) of the layer (B) is one, two is preferred.

Modified Polyolefin (b)

The modified polyolefin (b) is a polyolefin having a basic nitrogen-containing group. The olefin constituting the modified polyolefin (b) is, for example, an aliphatic α-olefin, a cyclic olefin, or a non-conjugated diene, each having 2 to 20 carbon atoms, preferably an aliphatic α-olefin having 2 to 10 carbon atoms, and still more preferably an aliphatic α-olefin having 2 to 8 carbon atoms. These olefins may be used alone of one type, or two or more types thereof may be used. In the case of the copolymer in which two or more types of olefins are used, a content of the olefin monomer unit that serves as a comonomer is not particularly limited as long as the effects of the invention are achieved, and is typically 50 mol % or less, preferably 40 mol % or less, and still more preferably 30 mol % or less. Of the polyolefins falling within such a range, polyethylene, polypropylene, polybutene-1, poly-4-methylpentene-1, and an α-olefin copolymer of the same are preferred, and polyethylene, polypropylene, and a propylene-ethylene copolymer are more preferred. The polyolefin may be, as long as the effects of the invention can be achieved, a copolymer of one, or two or more types of olefin, with a monomer other than an olefin. In addition, these can be used as both an isotactic structure and a syndiotactic structure, and stereoregularity is not particularly limited.

The basic nitrogen-containing group is not particularly limited as long as it is basic and is a group containing a nitrogen atom. The basic nitrogen-containing group is exemplified by an amino group, an imino group, a cyano group, and the like. The basic nitrogen-containing group is also exemplified by those in a state of chemically bonding to a group in a component of the other layer at the interface of the layer. In light of a higher degree of basicity, i.e., a higher reactivity with the carboxy group and the lactone ring, and the like, the basic nitrogen-containing group preferably includes at least one of an amino group and an imino group, and more preferably an imino group. In the case in which the modified polyolefin (b) has such a basic nitrogen-containing group, it is speculated that a stronger chemical bond can be formed with at least one of the carboxy group and the lactone ring of the EVOH (a), whereby a decrease of the interlayer adhesive force can be further inhibited in a case of use in a harsh environment for a long period of time.

The amino group may be, for example, a monovalent group derived from ammonia, a primary amine, or a secondary amine by removing one hydrogen atom bonding to the nitrogen atom. The amino group is a group represented by, for example, —$NR^1_2$ (wherein each $R^1$ independently represents a hydrogen atom or an organic group, and the organic group which may be represented by $R^1$ may bond to another group). It is to be noted that the organic group as referred to herein means a group that includes a carbon atom, and is exemplified by a hydrocarbon group, a carboxy group, a cyano group, an alkoxy group, and the like. Also, the organic group which may be represented by $R^1$ may have 1 to 40 carbon atoms, may have 1 to 10 carbon atoms, or may have 1 to 4 carbon atoms. $R^1$ represents preferably a hydrogen atom or the hydrocarbon group.

The amino group preferably bonds to a hydrocarbon group, and more preferably bonds to a saturated hydrocarbon group.

The imino group may be, for example, a group derived from ammonia or a primary amine by removing two hydrogen atoms bonding to the nitrogen atom, and may involve both a group in which nitrogen bonds to one other atom via a double bond, and a group in which nitrogen bonds to two other atoms via a single bond. The imino group is a group represented by, for example, =$NR^2$ or —$NR^2$— (wherein each $R^2$ each independently represents a hydrogen atom or an organic group, and the organic group which may be represented by $R^2$ may bond to another group). The organic group which may be represented by $R^2$ may be a hydrocarbon group. Also, the organic group which may be represented by $R^2$ may have 1 to 40 carbon atoms, may have 1 to 10 carbon atoms, or may have 1 to 4 carbon atoms. $R^2$ represents preferably a hydrogen atom or the hydrocarbon group.

The imino group may be present as a carbodiimide group (—N=C=N— or —N=C=$NR^2$), a urea group (—NHCONH— or —NHCON$HR^2$), a polyimine chain such as a polyethyleneimine chain (—$(CH_2CH_2NH)_n$—), or the like.

The modified polyolefin (b) may be produced by a well-known method. For example, the modified polyolefin (b) can be obtained by:

(1) a method of allowing a reactive compound (y) having a basic nitrogen-containing group to react with a polyolefin (x) having a group reactable to the reactive compound (y);

(2) a method of allowing a compound (z) having a basic nitrogen-containing group and being graft polymerizable, to react with a modified or unmodified polyolefin;

(3) a method of halogenating a modified or unmodified polyolefin, followed by allowing to react with ammonia; or the like.

The polyolefin (x) having a reactable group in the method (1) can be appropriately selected depending on the type of the reactive compound (y), and an acid-modified polyolefin is preferred. The acid-modified polyolefin as referred to herein means a modified polyolefin having an acidic group such as a carboxy group, or having an acid anhydride group.

The acid-modified polyolefin may be produced by a conventionally well-known method. The acid-modified polyolefin may be produced by, for example, a method of subjecting an unmodified polyolefin to graft copolymerization with an unsaturated carboxylic acid or a derivative thereof, a method of subjecting an olefin to radical copolymerization with an unsaturated carboxylic acid or a derivative thereof, or the like.

Examples of the unsaturated carboxylic acid or a derivative thereof include unsaturated carboxylic acids such as acrylic acid, methacrylic acid, maleic acid, fumaric acid, tetrahydrophthalic acid, itaconic acid, citraconic acid, crotonic acid, isocrotonic acid, norbornenedicarboxylic acid, and bicyclo[2,2,1]hept-2-ene-5,6-dicarboxylic acid, derivatives of the same (for example, acid anhydrides, acid halides, amides, imides, esters, and the like).

The amount of modification of the acid-modified polyolefin is, provided that a polyolefin moiety constituting the acid-modified polyolefin is 100% by mass, typically 0.05 to 20% by mass, preferably 0.05 to 10% by mass, and still more preferably 0.05 to 5% by mass. In the case of the acid-modified polyolefin which had been subjected to graft polymerization, the amount of modification may be equivalent to the amount of grafting.

The reactive compound (y) is exemplified by an amino group-containing compound having a plurality of primary amino groups, a polycarbodiimide having a plurality of carbodiimide groups, and the like. By using the amino group-containing compound, the modified polyolefin having an amino group as the basic nitrogen-containing group is obtained. Also, by using the polycarbodiimide group, the modified polyolefin having a carbodiimide group that is a group including an imino group as the basic nitrogen-containing group is obtained. It is to be noted that a carbodiimide group can be a substitute for an urea group by absorbing water. However, this case also provides the modified polyolefin having a urea group that is a group including an imino group, as the basic nitrogen-containing group.

Examples of the amino group-containing compound include: aliphatic amines such as ethylenediamine, propylenediamine, tetramethylenediamine, hexamethylenediamine, diethylenetriamine, triethylenetetramine, tetraethylenepentamine, iminobispropylamine, bis(hexamethylene)triamine, 1,3,6-trisaminomethylhexane, trimethylhexamethylenediamine, bispropylenediamine, diethylaminopropylamine, and polyoxyalkylenepolyamine; alicyclic amines such as menthenediamine, isophoronediamine, bis(4-amino-3-methylcyclohexyl)methane, and 1,3-diaminocyclohexane; aromatic amines such as o-, m-, or p-phenylenediamine, 4,4'-diaminodiphenylmethane, diaminodiphenylsulfone, 2,4-diaminoanisole, 2,4-toluenediamine, 2,4-diaminodiphenylamine, and diaminodixylylsulfone; and the like.

The polycarbodiimide is exemplified by a compound having a plurality of structural units represented by the following formula (1).

—N=C=N—R$^a$—  (1)

In the formula (1), R$^a$ represents a divalent organic group having 2 to 40 carbon atoms.

The polycarbodiimide may be produced by, for example, performing a decarboxylating condensation reaction of an organic diisocyanate such as aliphatic diisocyanate, aromatic diisocyanate, or alicyclic diisocyanate in the presence of a condensation catalyst, without a solvent or in an inert solvent. For example, a diisocyanate such as hexamethylene diisocyanate, 4,4-diphenylmethane diisocyanate, 1,4-phenylene diisocyanate, 2,4-tolylene diisocyanate, xylylene diisocyanate, cyclohexane-1,4-diisocyanate, dicyclohexylmethane-4,4'-diisocyanate, or isophorone diisocyanate, and the like are used either alone or as a mixture of multiple types thereof. In the decarboxylating condensation reaction, the degree of polymerization of the polycarbodiimide can be adjusted by selecting the catalyst, the reaction temperature, an end-capping agent, and the like. The degree of polymerization is typically 2 to 40, and preferably 4 to 20. The end-capping agent which can be used is exemplified by monoisocyanates such as phenylisocyanate, tolylisocyanate, and naphthylisocyanate, and active hydrogen compounds such as methanol, ethanol, diethylamine, cyclohexylamine, succinic acid, benzoic acid, and ethyl mercaptan. The catalyst which can be used is exemplified by alcoholates of titanium, hafnium, zirconium, sodium, or calcium, and organic phosphorus compounds such as phosphorene oxide.

As the polycarbodiimide, a commercially available product can be used. The commercially available polycarbodiimide is exemplified by CARBODILITE (registered trademark) HMV-8CA and HMV-15CA, and CARBODILITE (registered trademark) LA1 manufactured by Nisshinbo Chemical Inc., and the like.

The reaction of the polyolefin (x) with the reactive compound (y) can be performed by subjecting the polyolefin (x) and the reactive compound (y) to melt kneading or the like.

Specific examples of the method (1) which can be adopted include methods disclosed in Japanese Unexamined Patent Application, Publication No. H07-053812, PCT International Publication No. 2018/155448, and the like.

The compound (z) having a basic nitrogen-containing group and being graft polymerizable in the method (2) is exemplified by a polyimine. Examples of the polyimine include compounds having a plurality of structural units represented by the following formula (2).

—R$^b$—NR$^c$—  (2)

In the formula (2), R$^b$ represents a divalent hydrocarbon group; and R$^c$ represents a hydrogen atom or an organic group.

R$^b$ represents preferably an alkylene group (alkanediyl group). R$^b$ has preferably 1 to 6 carbon atoms, and more preferably 2 to 3 carbon atoms. The organic group which may be represented by R$^c$ may be a hydrocarbon group. The organic group which may be represented by R$^c$ has preferably 1 to 10 carbon atoms, and may have 1 to 4 carbon atoms. R$^c$ represents preferably a hydrogen atom or the hydrocarbon group.

As a specific example of suitable polyimine, polyethyleneimine is exemplified.

The graft polymerization of the polyolefin and the compound (z) may be performed by subjecting the polyolefin, the compound (y), and a radical generator to melt kneading, or the like.

As a specific example of the method (2), the method disclosed in Japanese Unexamined Patent Application, Publication No. 2012-106494 can be adopted.

As a specific example of the method (3), the method disclosed in Japanese Unexamined Patent Application, Publication No. H06-322024 can be adopted.

The lower limit of a content of the modified polyolefin (b) in the resin composition (B) is preferably 5% by mass and more preferably 7% by mass, and may be still more preferably 10% by mass. On the other hand, the upper limit of the content of the modified polyolefin (b) may be 100% by mass, and may be 70% by mass, 40% by mass, or 20% by mass.

The content of the basic nitrogen-containing group in the resin composition (B) is, in terms of basic nitrogen equivalent in 100 g of the basic nitrogen-containing group, preferably 0.1 mmol or more and 100 mmol or less, more preferably 0.2 mmol or more and 80 mmol or less, and still more preferably 0.5 mmol or more and 60 mmol or less, and may be even more preferably 1 mmol or more and 40 mmol or less or 4 mmol or more and 25 mmol or less. When the content of the basic nitrogen-containing group in the resin composition (B) is equal to or more than the lower limit, a sufficient binding reaction between the EVOH (a) and the modified polyolefin (b) contained in the layer (B) can occur. On the other hand, when the content of the basic nitrogen-containing group in the resin composition (B) is equal to or less than the upper limit, crosslinking of the modified polyolefin (b) can be inhibited.

Other Component(s)

The resin composition (B) may further contain a resin other than the modified polyolefin (b), and other component(s). The resin other than the modified polyolefin (b) is exemplified by a polyolefin other than the modified polyolefin (b), and this polyolefin may be an acid-modified polyolefin, an imine-modified polyolefin, or the like. Alternatively, the resin other than the modified polyolefin (b) may be exemplified by various conventionally well-known types of thermoplastic resins. The other components are exemplified by a tackifier, a process stabilizer, a heat-resistant stabilizer, a heat-resistant aging agent, a filler, and the like.

Thickness, Etc.

The thickness of the layer (B) is not particularly limited, and the lower limit of the average thickness of one layer (B) may be, for example, 1 µm, and is preferably 10 µm, more preferably 20 µm, and may be still more preferably 30 µm, 40 µm, or 50 µm. Furthermore, the lower limit of the total average thickness of the one or a plurality of layer (B) may be, for example, 1 µm, and is preferably 10 µm, more preferably 30 µm, still more preferably 50 µm, and may be particularly preferably 60 µm, 70 µm, or 80 µm. By virtue of the layer (B) being comparatively thickened, the adhesiveness and durability thereof tend to improve. Although the reasons for these are not certain, in addition to the modified polyolefin (b) as an adhesive being provided in a sufficient amount, similar reasons for the case of the thickened layer (A) are speculated.

The upper limit of the average thickness of one layer (B) is, for example, preferably 200 µm and more preferably 150 µm, and may be still more preferably 100 µm, 90 µm, 80 µm, or 70 µm. Moreover, the upper limit of the total average thickness of the one or a plurality of layer (B) is, for example, preferably 400 µm and more preferably 200 µm, and may be still more preferably 140 µm. When the average thickness of one layer (B) or total layers (B) is equal to or less than the upper limit, flexibility, handleability and the like can be improved, and reduction in thickness can be realized. Additionally, when the average thickness of one layer (B) or total layers (B) is equal to or less than the upper limit, the interlayer adhesive force and durability thereof may be improved, which may result from improved flexibility.

The layer (B) may be formed by melt molding or the like using the resin composition (B) containing the modified polyolefin (b). The lower limit of a melt flow rate of the resin composition (B) is preferably 0.01 g/10 min, more preferably 0.05 g/10 min, and still more preferably 0.1 g/10 min.

On the other hand, the upper limit of the melt flow rate is preferably 500 g/10 min, more preferably 200 g/10 min, and still more preferably 100 g/10 min. When the melt flow rate of the resin composition (B) falls within the above range, moldability and appearance characteristics, etc., may improve. The melt flow rate of the resin composition (B) is defined as a value measured in accordance with ASTM D1238 under a condition involving a temperature of 230° C. and a load of 2,160 g.

The lower limit of a density of the resin composition (B) is preferably 0.870 g/cm$^3$, more preferably 0.875 g/cm$^3$, and still more preferably 0.880 g/cm$^3$. On the other hand, the upper limit of the density is preferably 0.940 g/cm$^3$. When the density of the resin composition (B) falls within the above range, production stability, molding processibility, adhesiveness, and the like of the resin composition (B) are improved. The density is defined as a value measured in accordance with JIS K7112.

Other Layer (X)

It is preferred that the multilayer structure of the present invention further includes one or a plurality of layer (X) other than the layer (A) and the layer (B). The one or a plurality of layer(s) (X) is/are exemplified by: one or a plurality of layer(s) (C) constituted from the resin composition (C) containing, as a principal component, the polyolefin (c) which does not substantially have a basic nitrogen-containing group; one or a plurality of layer(s) (D) constituted from the resin composition (D) containing the EVOH (a') which has at least one of a carboxy group and a lactone ring, and the modified polyolefin (b') which has a basic nitrogen-containing group; and the like. In a case in which there exists a plurality of number of the layers (X), formulation of the resin composition constituting each layer (X) may be identical or different. In light of productivity and the like, there may be a case in which the formulation of each resin composition of the plurality of layers (X) is preferably identical.

Layer (C))

The layer (C) is a layer constituted from the resin composition (C) containing, as a principal component, the polyolefin (c) which does not substantially have a basic nitrogen-containing group. Due to including the layer (C) in the multilayer structure of the present invention, moisture resistance and/or mechanical characteristics of the multilayer structure are improved. In addition, the layer (B) constituted from the resin composition (B) containing, as a principal component, the modified polyolefin (b) having a basic nitrogen-containing group is capable of favorably adhering also to the layer (C) constituted from the resin composition (C) containing the polyolefin (c) as a principal component.

The expression of "the polyolefin (c) which does not substantially have a basic nitrogen-containing group" as referred to herein means that a content of the basic nitrogen-containing group in the polyolefin (c) is, in terms of basic nitrogen equivalent in 100 g of the basic nitrogen-containing group, for example, less than 0.1 mmol, and the content may be less than 0.01 mmol, or may also be less than 0.001 mmol.

The polyolefin (c) is exemplified by a homopolymer and a copolymer of an α-olefin having 2 to 20 carbon atoms. The polyolefin (c) may be of either one type, or two or more types. Examples of the α-olefin include ethylene, propylene, 1-butene, 4-methyl-1-pentene, 1-hexene, 1-octene, and the like. In the polyolefin (c), an other monomer aside from the α-olefin may be copolymerized in a small amount, for example, 10 mol % or less. The other monomer is not particularly limited, and is exemplified by a monomer having a polar group (a carbonyl group, a hydroxy group, an alkoxy group, etc.) and a polymerizable group in its molecule, and the like. As the polyolefin (c), polypropylene, polyethylene, and an ethylene-propylene copolymer are preferred.

The lower limit of a content of the polyolefin (c) in the resin composition (C) is preferably 50% by mass and more preferably 70% by mass, and may be still more preferably 90% by mass. On the other hand, the upper limit of the content of the polyolefin (c) may be 100% by mass, or may be 99% by mass, 90% by mass, or 80% by mass.

The resin composition (C) may further contain a resin other than the polyolefin (c), and other component(s). Examples of the resin other than the polyolefin (c) include thermoplastic resins such as polystyrene, polyvinyl chloride, polyvinylidene chloride, an acrylic resin, a vinyl ester-based resin, a polyurethane elastomer, polycarbonate, chlorinated polyethylene, and chlorinated polypropylene. The other components are exemplified by a process stabilizer, a heat-resistant stabilizer, a heat-resistant aging agent, a filler, and the like.

Layer (D)

The layer (D) is a layer constituted from the resin composition (D) containing: the EVOH (a') having at least one of a carboxy group and a lactone ring; and the modified polyolefin (b') having a basic nitrogen-containing group. One example of the EVOH (a') having at least one of a carboxy group and a lactone ring is exemplified by the EVOH (a) having at least one of a carboxy group and a lactone ring, and being contained in the resin composition (A). The modified polyolefin (b') having a basic nitrogen-containing group is exemplified by the modified polyolefin (b) having a basic nitrogen-containing group, and being contained in the resin composition (B). The EVOH (a') in the resin composition (D), and the EVOH (a) in the resin composition (A) may be identical or different. The modified polyolefin (b') in the resin composition (D), and the modified polyolefin (b) in the resin composition (B) may be identical or different.

The resin composition (D) may further contain the polyolefin (c') which does not substantially have a basic nitrogen-containing group. The polyolefin (c') which does not substantially have a basic nitrogen-containing group is exemplified by the polyolefin (c) which does not substantially have a basic nitrogen-containing group and is contained in the resin composition (C). The polyolefin (c') in the resin composition (D) and the polyolefin (c) in the resin composition (C) may be identical or different.

The layer (D) is preferably formed by using recovered materials from the layer (A) and the layer (B), or recovered materials from the layer (A), the layer (B), and the layer (C) in a production process of the multilayer structure of the present invention. Examples of the recovered material include burrs generated in the production process of the multilayer structure, products which have failed an inspection, and the like. When the multilayer structure further includes the layer (D) as such a recovery layer, reuse of the burrs, products which have failed an inspection, and the like is enabled, whereby loss of the resin used in production of the multilayer structure can be reduced.

Although the layer (D) can be used also as a substitute for the layer (C), it is preferred that the layer (C) and the layer (D) having been laminated are used since, in general, the layer (D) has less mechanical strength than the layer (C).

The upper limit of a content of the EVOH (a') in the resin composition (D) is preferably 30% by mass, and more preferably 10% by mass. When the content of the EVOH (a') in the resin composition (D) is equal to or less than the upper limit, the mechanical strength can be enhanced, which may lead to, e.g., reduction of generation of cracks. On the other hand, the lower limit of the content of the EVOH (a') in the resin composition (D) is preferably 1% by mass, and more preferably 3% by mass.

The upper limit of a content of the EVOH (b') in the resin composition (D) is preferably 30% by mass, and more preferably 10% by mass. On the other hand, the lower limit of the content of the EVOH (b') in the resin composition (D) is preferably 0.1% by mass, and more preferably 0.3% by mass.

The upper limit of a content of the polyolefin (c') in the resin composition (D) is preferably 98% by mass, and more preferably 95% by mass. On the other hand, the lower limit of the content of the polyolefin (c') in the resin composition (D) is preferably 10% by mass, more preferably 30% by mass, and still more preferably 50% by mass. When the content of the polyolefin (c') in the resin composition (D) is equal to or more than the lower limit, the mechanical strength can be enhanced.

The resin composition (D) may further contain other component(s) aside from the EVOH (a'), the polyolefin (b'), and the polyolefin (c'). Examples of the other component include components exemplified as optional components in each resin composition constituting the layer (A), the layer (B), and the layer (C), and the like.

Other Layer(s)

In addition to the layer (C) and the layer (D) described above, the layer (X) may be, for example, a layer in which a thermoplastic resin such as polystyrene, polyvinyl chloride, polyvinylidene chloride, an acrylic resin, a vinyl ester-based resin, a polyurethane elastomer, polycarbonate, chlorinated polyethylene, or chlorinated polypropylene is contained as a principal component. Alternatively, the layer (X) may be paper, woven fabric, nonwoven fabric, a metal layer, a metal oxide layer, an other inorganic substance layer, or the like.

Thickness, Etc.

The thickness of the layer (X) (the layer (C), the layer (D), etc.) is not particularly limited, and the lower limit of an average thickness of one layer (X) may be, for example, 10 µm, and is preferably 100 µm and more preferably 300 µm, and may be still more preferably 500 µm. Furthermore, the lower limit of the total average thickness of the one or a plurality of layer (X) is, for example, preferably 200 µm and more preferably 600 µm, and may be still more preferably 1,000 µm. By virtue of the layer (X) being comparatively thickened, in addition to merely enhancing the mechanical strength and the like, the adhesiveness and durability thereof tend to improve. Although the reasons for these are not certain, similar reasons for the case of the thickened layer (A) are speculated.

The upper limit of the average thickness of one layer (X) is, for example, preferably 3,000 µm and more preferably 2,000 µm, and may be still more preferably 1,000 µm. Moreover, the upper limit of the total average thickness of the one or the plurality of layer (X) is, for example, preferably 6,000 µm and more preferably 4,000 µm, and may be still more preferably 2,000 µm. When the average thickness of one layer (X) or total layers (X) is equal to or less than the upper limit, handleability and the like can be improved, and reduction in thickness can be realized.

In the case in which the layer (X) is, for example, the layer (C), the layer (D) and/or the like, the layer (X) can be formed by melt molding or the like using a resin composition containing each component constituting each layer.

Layer Structure

In the multilayer structure of the present invention, at least one of the layer (A) and at least one of the layer (B) are directly laminated. In other words, another layer is not present between this one layer (A) and this one layer (B). Thus, at the interface of the layer (A) and the layer (B) being in direct contact, a chemical bond is formed between the basic nitrogen-containing group of the modified polyolefin (b), and at least one of the carboxy group and the lactone ring of the EVOH (a), whereby strong adhesive force and superior durability thereof are expected to be attained.

The number of layers of the multilayer structure of the present invention may be at least 2, and is preferably 3 or more, and more preferably 5 or more. Furthermore, the upper limit of the number of layers of the multilayer structure may be, for example, 1,000, 100, 30, or 10.

The multilayer structure of the present invention includes preferably a three-layer structure in which the layer (B), the layer (A), and the layer (B) are directly laminated in this order, and more preferably a five-layer structure in which the layer (X), the layer (B), the layer (A), the layer (B), and the layer (X) are directly laminated in this order. In this structure, the layer (X) is preferably either one of the layer (C) or the layer (D). When the multilayer structure has such a layer structure, high adhesiveness between the layer (A) and the layer (B), and further, high adhesiveness between the layer (B) and the layer (X) are more sufficiently achieved. Thus, in the case in which such a layer structure is included, adaptability in a harsh environment such as exposure to hot water, an acid, or an alkali can be further improved.

Examples of specific layer structures of the multilayer structure of the present invention include the following layer structures.

layer (C)/layer (B)/layer (A)/layer (B)/layer (C)
layer (D)/layer (B)/layer (A)/layer (B)/layer (D)
layer (C)/layer (B)/layer (A)/layer (B)/layer (D)
layer (C)/layer (D)/layer (B)/layer (A)/layer (B)/layer (D)
layer (D)/layer (C)/layer (B)/layer (A)/layer (B)/layer (D)
layer (C)/layer (D)/layer (B)/layer (A)/layer (B)/layer (C)
layer (D)/layer (C)/layer (B)/layer (A)/layer (B)/layer (C)
layer (C)/layer (D)/layer (B)/layer (A)/layer (B)/layer (D)/layer (C)
layer (D)/layer (C)/layer (B)/layer (A)/layer (B)/layer (C)/layer (D)
layer (C)/layer (D)/layer (B)/layer (A)/layer (B)/layer (C)/layer (D)

A total average thickness of the multilayer structure of the present invention is not particularly limited, and the lower limit may be, for example, 10 μm or 100 μm, and is preferably 500 μm, still more preferably 750 μm, and particularly preferably 1,000 μm. When the total average thickness is equal to or more than the lower limit, the interlayer adhesiveness and durability thereof tend to improve. Although the reasons for these are not certain, it is speculated that, for example, in a case in which the multilayer structure is produced by melt molding such as coextrusion, an increased thickness may lead to gradual lowering of the temperature during and after the film formation, whereby an interlayer binding reaction between the layer (A) and the layer (B) in these time periods can be more likely to proceed. In particular, such an operative effect is presumed to be achieved prominently by thickening the entirety of the multilayer structure. The upper limit of the total average thickness of the multilayer structure is, for example, preferably 10,000 μm and more preferably 5,000 μm, and may be still more preferably 2,000 μm. When the total average thickness is equal to or less than the upper limit, handleability and the like can be improved, and reduction in thickness can be realized. Also, when the total average thickness is equal to or less than the upper limit, the interlayer adhesive force and durability thereof may be improved, which may result from improved flexibility.

When the total average thickness of the multilayer structure of the present invention is equal to or more than the lower limit, or equal to or more than the lower limit and equal to or less than the upper limit, it is preferred that as the lower limit and the upper limit of a preferred average thickness of each layer (the layer (A), the layer (B), etc.), the lower limit and the upper limit of preferred average thickness of each layer described above are adopted.

The shape of the multilayer structure of the present invention is not particularly limited, and may be in a sheet shape, or may be molded to have a predetermined shape such as a pipe shape or a container shape.

Intended Usage

The multilayer structure of the present invention is used for intended usage similar to multilayer structures including conventional EVOH(s), such as a packaging material, a container, a sheet, a pipe, a machine part, and a wallpaper. However, according to the multilayer structure of the present invention, a decrease of the interlayer adhesive force is prevented even in the case of use in a harsh environment such as exposure to hot water, a high temperature, high humidity, an acid, or an alkali for a long period of time. Thus, the multilayer structure can be particularly suitably used for intended usage which can be accompanied by use in an environment in which exposure to hot water, high temperature, high humidity, acid or alkali is involved for a long period of time. Examples of such intended usage include a sheet for preventing diffusion of hazardous substances, a landfill geomembrane, a multilayer pipe, an agricultural sheet, an agricultural container, a chemical container, an automotive fuel tank, and the like, and of these, the multilayer structure is preferably applied to the sheet for preventing diffusion of hazardous substances, the landfill geomembrane, and the multilayer pipe.

Method for Producing Multilayer Structure

A method for producing the multilayer structure of the one embodiment of the present invention is not particularly limited, and coextrusion is preferably performed for production. In other words, the method for producing a multilayer structure of an other embodiment of the present invention includes a step of coextruding using: the resin composition (A) containing EVOH (a) as a principal component; and the resin composition (B) containing a modified polyolefin (b) which includes a basic nitrogen-containing group, such that at least one layer (A) formed from the resin composition (A) and at least one layer (B) formed from the resin composition (B) are directly laminated, wherein the EVOH (a) has at least one of a carboxy group and a lactone ring, and a total amount of the carboxy group and the lactone ring with respect to a total amount of an ethylene unit, a vinyl alcohol unit, and a vinyl ester unit of the EVOH (a) is 0.08 mol % or more and 0.4 mol % or less.

Specific formulations of the resin composition (A) and the resin composition (B) used in the method for producing a multilayer structure are similar to the aforementioned formulations of the resin composition (A) constituting the layer (A), and the resin composition (B) constituting the layer (B), respectively. In the case in which the multilayer structure further includes the layer (C) and the layer (D), the coextrusion may be carried out further using the resin composition (C) for forming the layer (C), and the resin composition (D) for forming the layer (D).

The multilayer structure of the present invention may be formed by using a conventionally well-known coextrusion molding apparatus. The multilayer structure may be formed so as to have a predetermined layer structure by, for example, charging the resin composition (A) and the resin composition (B), and as needed, the resin composition (C), the resin composition (D) and/or the like into separate extruders, respectively, followed by carrying out coextrusion using these extruders.

The extrusion molding of each layer is carried out by operating an extruder equipped with a single screw at a certain temperature. The temperature of the extruder for the resin composition (A) may be, for example, 170° C. or higher and 240° C. or lower. The temperature of the extruder for the resin composition (B) is, for example, preferably 200° C. or higher and 300° C. or lower. The temperature of the extruder for the resin composition (C) is preferably 200° C. or higher and 250° C. or lower. The temperature of the extruder for the resin composition (D) is preferably 200° C. or higher and 240° C. or lower. A die temperature is preferably 200° C. or higher and 300° C. or lower.

After the multilayer structure is obtained by the coextrusion, a heat treatment may or may not be carried out. Furthermore, after the multilayer structure in a sheet shape is obtained, molding into a multilayer structure (molded article) having an intended shape may be performed by a secondary processing. A procedure for the secondary processing may be exemplified by a stretching process, a thermoforming process, a blow molding process, and the like. Examples of the stretching process include a roll stretching process, a tenter stretching process, a tubular stretching process, a blow stretching process, and the like. In a case of performing biaxial stretching by the stretching process, either one of a simultaneous biaxial stretching process and a sequential biaxial stretching process may be employed. The thermoforming process may be exemplified by a vacuum forming process, a pressure forming process, a vacuum/pressure forming process, and the like. By the thermoforming process, a multilayer structure in a sheet shape can be molded into a cup shape or a tray shape. In addition, examples of the blow molding process include a process in which a multilayer structure in a parison shape is molded into a bottle shape or a tubular shape by blowing.

The multilayer structure of the present invention may be produced by a procedure other than the coextrusion. For example, an extrusion laminate process, a dry laminate process, a solution coating process, or the like may be employed for the production.

Sheet for Preventing Diffusion of Hazardous Substances

The sheet for preventing diffusion of hazardous substances of a further embodiment of the present invention includes the multilayer structure of the one embodiment of the present invention. The sheet for preventing diffusion of hazardous substances may be the multilayer structure in a sheet shape of the one embodiment of the present invention per se.

The sheet for preventing diffusion of hazardous substances of the further embodiment of the present invention may be: a sheet to be embedded to enclose soil contaminated with heavy metals and/or the like; a sheet to be embedded around an underground tank of gasoline or the like, or to enclose a ground of a site surrounding a gasoline station; a sheet for soil fumigation; a sheet for preventing diffusion of substances with radioactive contamination such as a radon barrier sheet; and the like. The sheet for preventing diffusion of hazardous substances may be for embedding underground, for covering ground surface, for sealing hazardous substances after being processed into a container or a bag, or the like.

Landfill Geomembrane

The landfill geomembrane of still other embodiment of the present invention includes the multilayer structure of the one embodiment of the present invention. The landfill geomembrane may be the multilayer structure of the one embodiment of the present invention per se in a sheet shape.

The landfill geomembrane of the still other embodiment of the present invention is, for example, a sheet to be used for seepage control work in a waste treatment site or the like. The landfill geomembrane is required to be capable of sealing: hazardous substances which may be contained in the waste; volatile constituents generated by decomposition of the waste; and the like. In addition, a property of being resistant to environments of high temperatures and high humidity for a long period of time is required, because of possibility of heat generation along with the decomposition of the waste, and underground embedment. Examples of the waste and volatile constituents include methane, benzene, toluene, trichloroethylene and the like, as well as household garbage which can generate the same, and the like. Therefore, the multilayer structure of the one embodiment of the present invention can be advantageously applied to landfill geomembranes.

Multilayer Pipe

The multilayer pipe of yet other embodiment of the present invention includes the multilayer structure of the one embodiment of the present invention. The multilayer pipe may be the multilayer structure of the one embodiment of the present invention per se in a pipe shape.

The multilayer pipe of the yet other embodiment of the present invention maintains a strong interlayer adhesive force even in use at a high temperature for a long period of time. The multilayer pipe is suitably used for, in particular, a hot water circulation pipe and a heat insulating multilayer pipe for regional air-conditioning. In the case in which the multilayer pipe is a heat insulating multilayer pipe, for example, a configuration including: an inner tube, a heat insulating foam layer, and an outer tube in this order from inside; and an outer tube formed from the multilayer structure of the one embodiment of the present invention may be provided.

The type (material), the shape, and the size of the pipe used for the inner tube are not particularly limited as long as transportation of a heating medium such as a gas or liquid is enabled, and can be appropriately selected depending on the type of the heating medium, intended usage and usage mode of the piping material, and the like. Specifically, metals such as copper, stainless steel, and aluminum; resins such as polyolefin; and the like are exemplified.

As the heat insulating foam, polyurethane foam, polyethylene foam, polystyrene foam, phenol foam, and/or polyisocyanurate foam may be used, and the polyurethane foam is suitably employed, in light of an improvement of thermal insulation performance. Chlorofluorocarbons, various types of alternative chlorofluorocarbons, water, chlorinated hydrocarbons, hydrocarbons, carbon dioxide, and the like can be used as a foaming agent for the heat insulating foam, and hydrocarbon, specifically, n-pentane and cyclopentane can be suitably used in light of an effervescent effect, and influences on the environment.

An exemplary method for producing a heat insulating multilayer pipe includes: inserting into an outer tube, an inner tube for transporting the heating medium; fixing the inner tube with a spacer to give a double pipe; then infusing various types of material solutions for foaming into a space between the inner tube and the outer tube; and allowing for foaming and hardening.

EXAMPLES

Hereinafter, the present invention is specifically explained by way of Examples and the like, but the present invention is not limited to these Examples.

Synthesis Example 1: Synthesis of EVOH-A

Into a 100 L pressurized reactor equipped with a jacket, a stirrer, a nitrogen feed port, an ethylene feed port, and an initiator addition port, 40.0 kg of vinyl acetate (hereinafter, may be referred to as VAc) and 4.0 kg of methanol (hereinafter, may be referred to as MeOH) were charged, and an interior of the reactor was replaced with nitrogen by bubbling nitrogen for 30 min. Next, after the temperature in the reactor was adjusted to 60° C., ethylene was introduced such that the reactor pressure (ethylene pressure) became 4.83 MPa, and polymerization was started by adding 18.8 g of 2,2'-azobis(2,4-dimethylvaleronitrile) ("V-65" manufactured by Wako Pure Chemical Industries, Ltd.) as the initiator. During the polymerization, the ethylene pressure was maintained at 4.83 MPa, and the polymerization temperature was maintained at 60° C. After 4 hrs when the conversion rate of VAc (rate of polymerization in terms of VAc) became 50.4%, the polymerization was stopped by cooling. The reactor was opened to allow elimination of ethylene, and thereafter the nitrogen gas was bubbled to complete the elimination of ethylene. Subsequently, after unreacted VAc was eliminated under a reduced pressure, a 20% by mass solution in MeOH was prepared by adding MeOH to an ethylene-vinyl acetate copolymer (hereinafter, may be also abbreviated as "EVAc").

Then, into a 300 L reactor equipped with a jacket, a stirrer, a nitrogen feed port, a reflux condenser, and a solution addition port, 100 kg of a 20% by mass EVAc solution in MeOH was charged. While nitrogen was blown into this solution, the temperature was elevated to 60° C., and a solution of sodium hydroxide with a concentration of 2 N in MeOH was added at a rate of 300 mL/min for 2 hrs. After completion of the addition of the sodium hydroxide solution in MeOH, an internal temperature of the system was maintained at 60° C., and while outflow of methyl acetate produced by the saponification reaction and MeOH was allowed outside the reactor, the saponification reaction was proceeded, with stirring of the mixture for 2 hrs. Subsequently, 5.8 kg of acetic acid was added to the mixture, whereby the saponification reaction was stopped.

Thereafter, with heating and stirring at 80° C., 75 L of ion exchanged water was added to allow outflow of MeOH from the reactor, and precipitation of the EVOH was permitted. Thus precipitated EVOH was collected by decantation, and was ground by a grinder. The EVOH powder thus obtained was charged into a 1 g/L aqueous acetic acid solution (bath ratio 20:a ratio of 20 L of the aqueous solution with respect to 1 kg of the powder) and washed with stirring for 2 hrs. The EVOH powder was deliquored and further, charged into a 1 g/L aqueous acetic acid solution (bath ratio 20) and washed with stirring for 2 hrs. Purification was conducted by repeating three times, an operation of: charging the EVOH powder into ion exchanged water (bath ratio 20):washing with stirring for 2 hrs; and carrying out deliquoring. Next, the EVOH powder was immersed with stirring for 4 hrs in 250 L of an aqueous solution containing 0.5 g/L acetic acid and 0.1 g/L sodium acetate, and then deliquored. Thereafter, drying at 60° C. for 16 hrs gave 10.7 kg of crude dry matter of the EVOH.

Into a 60 L mixing vessel equipped with a jacket, a stirrer, and a reflux condenser, 10 kg of the EVOH crude dry matter, 4 kg of water, and 11 kg of MeOH were charged, and dissolution was allowed by elevating the temperature to 85° C. This solution was extruded into a mixed liquid of water/MeOH=90/10, which had been cooled to −5° C., through a metal plate with a hole having a diameter of 4 mm to allow for precipitation in a strand shape, and this strand was cut into a pellet shape with a strand cutter to give water-containing pellets of the EVOH. As a result of a measurement using Halogen Moisture Analyzer "HR73" manufactured by Mettler Toledo, the moisture content of the water-containing pellets of the EVOH obtained was 50% by mass.

18.7 kg of the water-containing pellets of the EVOH obtained above was charged into a 1 g/L aqueous acetic acid solution (bath ratio 20) and washed with stirring for 2 hrs. The water-containing pellets were deliquored and further, charged into a 1 g/L aqueous acetic acid solution (bath ratio 20) and washed with stirring for 2 hrs. After deliquoring, the aqueous acetic acid solution was renewed and a similar operation was conducted. After washing with an aqueous acetic acid solution and then deliquoring, purification was conducted by repeating three times, an operation of: charging the water-containing pellets into ion exchanged water (bath ratio 20):washing with stirring for 2 hrs; and carrying out deliquoring, to give the water-containing pellets of the EVOH, with catalyst residues, which had been contained in the saponification reaction, having been eliminated. The water-containing pellets were charged into an aqueous solution (bath ratio 20) having a sodium acetate concentration of 0.510 g/L, an acetic acid concentration of 0.8 g/L, a phosphoric acid concentration of 0.04 g/L, and a boric acid concentration of 0.25 g/L, and were immersed therein while periodically stirring the mixture for 4 hrs. The pellets were deliquored, and dried at 80° C. for 3 hrs and then at 105° C. for 16 hrs, to give EVOH pellets containing EVOH-A, acetic acid, sodium salt, phosphoric acid, and boric acid.

Synthesis Example 2: Synthesis of EVOH-B

Into a 200 L pressurized reactor equipped with a jacket, a stirrer, a nitrogen feed port, an ethylene feed port, and an initiator addition port, 65.0 kg of VAc and 13.0 kg of MeOH were charged, and an interior of the reactor was replaced with nitrogen by bubbling nitrogen for 30 min. Next, after the temperature in the reactor was adjusted to 60° C., ethylene was introduced such that the reactor pressure (ethylene pressure) became 2.25 MPa, and polymerization was started by adding 6.4 g of 2,2'-azobis(2,4-dimethylvaleronitrile) ("V-65" manufactured by Wako Pure Chemical Industries, Ltd.) as the initiator. During the polymerization, the ethylene pressure was maintained at 2.25 MPa, and the polymerization temperature was maintained at 60° C. After 4 hrs when the conversion rate of VAc became 40.4%, the polymerization was stopped by cooling. The reactor was opened to allow elimination of ethylene, and thereafter the nitrogen gas was bubbled to complete the elimination of ethylene. Subsequently, after unreacted VAc was eliminated under a reduced pressure, a 20% by mass solution in MeOH was prepared by adding MeOH to EVAc.

Then, into a 300 L reactor equipped with a jacket, a stirrer, a nitrogen feed port, a reflux condenser, and a solution addition port, 130 kg of a 15% by mass EVAc solution in MeOH was charged. While nitrogen was blown into this solution, the temperature was elevated to 60° C., and a solution of sodium hydroxide with a concentration of 2 N in MeOH was added at a rate of 97 mL/min for 2 hrs. After completion of the addition of the sodium hydroxide solution in MeOH, an internal temperature of the system was maintained at 60° C., and while outflow of methyl acetate produced by the saponification reaction and MeOH was allowed outside the reactor, the saponification reaction was proceeded, with stirring of the mixture for 2 hrs. Subsequently, 1.9 kg of acetic acid was added to the mixture, whereby the saponification reaction was stopped.

Thereafter, with heating and stirring at 80° C., 50 L of ion exchanged water was added to allow outflow of MeOH from the reactor, and precipitation of the EVOH was permitted. Thus precipitated EVOH was collected by decantation, and was ground by a grinder. The EVOH powder thus obtained was charged into a 1 g/L aqueous acetic acid solution (bath ratio 20:a ratio of 20 L of the aqueous solution with respect to 1 kg of the powder) and washed with stirring for 2 hrs. The EVOH powder was deliquored and further, charged into a 1 g/L aqueous acetic acid solution (bath ratio 20) and washed with stirring for 2 hrs. Purification was conducted by repeating three times, an operation of: charging the EVOH powder into ion exchanged water (bath ratio 20):washing with stirring for 2 hrs; and carrying out deliquoring. Next, the EVOH powder was immersed with stirring for 4 hrs in 250 L of an aqueous solution containing 0.5 g/L acetic acid and 0.1 g/L sodium acetate, and then deliquored. Thereafter, drying at 60° C. for 16 hrs gave 10.1 kg of crude dry matter of the EVOH.

Into a 60 L mixing vessel equipped with a jacket, a stirrer, and a reflux condenser, 10 kg of the EVOH crude dry matter, 7 kg of water, and 8 kg of MeOH were charged, and dissolution was allowed by elevating the temperature to 85° C. This solution was extruded into a mixed liquid of water/MeOH=90/10, which had been cooled to −5° C., through a metal plate with a hole having a diameter of 4 mm to allow for precipitation in a strand shape, and this strand was cut into a pellet shape with a strand cutter to give water-containing pellets of the EVOH. As a result of a measurement using Halogen Moisture Analyzer "HR73" manufactured by Mettler Toledo, the moisture content of the water-containing pellets of the EVOH obtained was 61% by mass.

23.6 kg of the water-containing pellets of the EVOH obtained above was charged into a 1 g/L aqueous acetic acid solution (bath ratio 20) and washed with stirring for 2 hrs. The water-containing pellets were deliquored and further, charged into a 1 g/L aqueous acetic acid solution (bath ratio 20) and washed with stirring for 2 hrs. After deliquoring, the aqueous acetic acid solution was renewed and a similar operation was conducted. After washing with an aqueous acetic acid solution and then deliquoring, purification was conducted by repeating three times, an operation of: charging the water-containing pellets into ion exchanged water (bath ratio 20):washing with stirring for 2 hrs; and carrying out deliquoring, to give the water-containing pellets of the EVOH, with catalyst residues, which had been contained in the saponification reaction, having been eliminated. The water-containing pellets were charged into an aqueous solution (bath ratio 20) having a sodium acetate concentration of 0.510 g/L, an acetic acid concentration of 0.8 g/L, and a phosphoric acid concentration of 0.04 g/L, and were immersed therein while periodically stirring the mixture for 4 hrs. The pellets were deliquored, and dried at 80° C. for 3 hrs and then at 105° C. for 16 hrs, to give EVOH pellets containing EVOH-B, acetic acid, sodium salt, and phosphoric acid.

Synthesis Example 3: Synthesis of EVOH-C

Into a 100 L pressurized reactor equipped with a jacket, a stirrer, a nitrogen feed port, an ethylene feed port, and an initiator addition port, 40.0 kg of VAc and 2.0 kg of MeOH were charged, and an interior of the reactor was replaced with nitrogen by bubbling nitrogen for 30 min. Next, after the temperature in the reactor was adjusted to 60° C., ethylene was introduced such that the reactor pressure (ethylene pressure) became 6.83 MPa, and polymerization was started by adding 36.0 g of 2,2'-azobis(2,4-dimethylvaleronitrile) ("V-65" manufactured by Wako Pure Chemical Industries, Ltd.) as the initiator. During the polymerization, the ethylene pressure was maintained at 6.83 MPa, and the polymerization temperature was maintained at 60° C. After 4 hrs when the conversion rate of VAc became 59.4%, the polymerization was stopped by cooling. The reactor was opened to allow elimination of ethylene, and thereafter the nitrogen gas was bubbled to complete the elimination of ethylene. Subsequently, after unreacted VAc was eliminated under a reduced pressure, a 20% by mass solution in MeOH was prepared by adding MeOH to EVAc.

Then, into a 300 L reactor equipped with a jacket, a stirrer, a nitrogen feed port, a reflux condenser, and a solution addition port, 100 kg of a 20% by mass EVAc solution in MeOH was charged. While nitrogen was blown into this solution, the temperature was elevated to 60° C., and a solution of sodium hydroxide with a concentration of 2 N in MeOH was added at a rate of 230 mL/min for 2 hrs. After completion of the addition of the sodium hydroxide solution in MeOH, an internal temperature of the system was maintained at 60° C., and while outflow of methyl acetate produced by the saponification reaction and MeOH was allowed outside the reactor, the saponification reaction was proceeded, with stirring of the mixture for 2 hrs. Subsequently, 4.5 kg of acetic acid was added to the mixture, whereby the saponification reaction was stopped.

Thereafter, with heating and stirring at 80° C., 75 L of ion exchanged water was added to allow outflow of MeOH from the reactor, and precipitation of the EVOH was permitted. Thus precipitated EVOH was collected by decantation, and was ground by a grinder. The EVOH powder thus obtained was charged into a 1 g/L aqueous acetic acid solution (bath ratio 20:a ratio of 20 L of the aqueous solution with respect to 1 kg of the powder) and washed with stirring for 2 hrs. The EVOH powder was deliquored and further, charged into a 1 g/L aqueous acetic acid solution (bath ratio 20) and washed with stirring for 2 hrs. Purification was conducted by repeating three times, an operation of: charging the EVOH powder into ion exchanged water (bath ratio 20):washing with stirring for 2 hrs; and carrying out deliquoring. Next, the EVOH powder was immersed with stirring for 4 hrs in 250 L of an aqueous solution containing 0.5 g/L acetic acid and 0.1 g/L sodium acetate, and then deliquored. Thereafter, drying at 60° C. for 16 hrs gave 11.5 kg of crude dry matter of the EVOH.

Into a 60 L mixing vessel equipped with a jacket, a stirrer, and a reflux condenser, 10 kg of the EVOH crude dry matter, 3 kg of water, and 12 kg of MeOH were charged, and dissolution was allowed by elevating the temperature to 85° C. This solution was extruded into a mixed liquid of water/MeOH=90/10, which had been cooled to −5° C., through a metal plate with a hole having a diameter of 4 mm to allow for precipitation in a strand shape, and this strand was cut into a pellet shape with a strand cutter to give water-containing pellets of the EVOH. As a result of a measurement using Halogen Moisture Analyzer "HR73" manufactured by Mettler Toledo, the moisture content of the water-containing pellets of the EVOH obtained was 50% by mass.

15.5 kg of the water-containing pellets of the EVOH obtained above was charged into a 1 g/L aqueous acetic acid solution (bath ratio 20) and washed with stirring for 2 hrs. The water-containing pellets were deliquored and further, charged into a 1 g/L aqueous acetic acid solution (bath ratio 20) and washed with stirring for 2 hrs. After deliquoring, the aqueous acetic acid solution was renewed and a similar operation was conducted. After washing with an aqueous acetic acid solution and then deliquoring, purification was conducted by repeating three times, an operation of: charging the water-containing pellets into ion exchanged water (bath ratio 20):washing with stirring for 2 hrs; and carrying out deliquoring, to give the water-containing pellets of the EVOH, with catalyst residues, which had been contained in the saponification reaction, having been eliminated. The water-containing pellets were charged into an aqueous solution (bath ratio 20) having a sodium acetate concentration of 0.510 g/L, an acetic acid concentration of 0.8 g/L, a phosphoric acid concentration of 0.04 g/L, and a boric acid concentration of 0.57 g/L, and were immersed therein while periodically stirring the mixture for 4 hrs. The pellets were deliquored, and dried at 80° C. for 3 hrs and then at 105° C. for 16 hrs, to give EVOH pellets containing EVOH-C, acetic acid, sodium salt, phosphoric acid, and boric acid.

Synthesis Example 4: Synthesis of EVOH-D

Into a 700 L pressurized reactor equipped with a jacket, a stirrer, a nitrogen feed port, an ethylene feed port, and an initiator addition port, 197 kg of Vac and 106 kg of MeOH were charged, and an interior of the reactor was replaced with nitrogen by bubbling nitrogen for 30 min. Next, after the temperature in the reactor was adjusted to 30° C., ethylene was introduced such that the reactor pressure (ethylene pressure) became 3.08 MPa, and polymerization was started by adding 400 g of dicyclohexyl peroxydicarbonate as the initiator. During the polymerization, the ethylene pressure was maintained at 3.08 MPa, and the polymerization temperature was maintained at 30° C. After 4 hrs when the conversion rate of VAc became 9.0%, the polymerization was stopped by cooling. The reactor was opened to allow elimination of ethylene, and thereafter the nitrogen gas was bubbled to complete the elimination of ethylene. Subsequently, after unreacted VAc was eliminated under a reduced pressure, a 20% by mass solution in MeOH was prepared by adding MeOH to EVAc.

Then, into a 300 L reactor equipped with a jacket, a stirrer, a nitrogen feed port, a reflux condenser, and a solution addition port, 100 kg of a 20% by mass EVAc solution in MeOH was charged. While nitrogen was blown into this solution, the temperature was elevated to 60° C., and a solution of sodium hydroxide with a concentration of 2 N in MeOH was added at a rate of 300 mL/min for 2 hrs. After completion of the addition of the sodium hydroxide solution in MeOH, an internal temperature of the system was maintained at 60° C., and while outflow of methyl acetate produced by the saponification reaction and MeOH was allowed outside the reactor, the saponification reaction was proceeded, with stirring of the mixture for 2 hrs. Subsequently, 5.8 kg of acetic acid was added to the mixture, whereby the saponification reaction was stopped.

Thereafter, with heating and stirring at 80° C., 75 L of ion exchanged water was added to allow outflow of MeOH from the reactor, and precipitation of the EVOH was permitted. Thus precipitated EVOH was collected by decantation, and was ground by a grinder. The EVOH powder thus obtained was charged into a 1 g/L aqueous acetic acid solution (bath ratio 20:a ratio of 20 L of the aqueous solution with respect to 1 kg of the powder) and washed with stirring for 2 hrs. The EVOH powder was deliquored and further, charged into a 1 g/L aqueous acetic acid solution (bath ratio 20) and washed with stirring for 2 hrs. Purification was conducted by repeating three times, an operation of: charging the EVOH powder into ion exchanged water (bath ratio 20):washing with stirring for 2 hrs; and carrying out deliquoring. Next, the EVOH powder was immersed with stirring for 4 hrs in 250 L of an aqueous solution containing 0.5 g/L acetic acid and 0.1 g/L sodium acetate, and then deliquored. Thereafter, drying at 60° C. for 16 hrs gave 10.7 kg of crude dry matter of the EVOH.

Into a 60 L mixing vessel equipped with a jacket, a stirrer, and a reflux condenser, 10 kg of the EVOH crude dry matter, 4 kg of water, and 11 kg of MeOH were charged, and dissolution was allowed by elevating the temperature to 85° C. This solution was extruded into a mixed liquid of water/MeOH=90/10, which had been cooled to −5° C., through a metal plate with a hole having a diameter of 4 mm to allow for precipitation in a strand shape, and this strand was cut into a pellet shape with a strand cutter to give water-containing pellets of the EVOH. As a result of a measurement using Halogen Moisture Analyzer "HR73" manufactured by Mettler Toledo, the moisture content of the water-containing pellets of the EVOH obtained was 48% by mass.

18.2 kg of the water-containing pellets of the EVOH obtained above was charged into a 1 g/L aqueous acetic acid solution (bath ratio 20) and washed with stirring for 2 hrs. The water-containing pellets were deliquored and further, charged into a 1 g/L aqueous acetic acid solution (bath ratio 20) and washed with stirring for 2 hrs. After deliquoring, the aqueous acetic acid solution was renewed and a similar operation was conducted. After washing with an aqueous acetic acid solution and then deliquoring, purification was conducted by repeating three times, an operation of: charging the water-containing pellets into ion exchanged water (bath ratio 20):washing with stirring for 2 hrs; and carrying out deliquoring, to give the water-containing pellets of the EVOH, with catalyst residues, which had been contained in the saponification reaction, having been eliminated. The water-containing pellets were charged into an aqueous solution (bath ratio 20) having a sodium acetate concentration of 0.510 g/L, an acetic acid concentration of 0.8 g/L, and a phosphoric acid concentration of 0.04 g/L, and were immersed therein while periodically stirring the mixture for 4 hrs. The pellets were deliquored, and dried at 80° C. for 3 hrs and then at 105° C. for 16 hrs, to give EVOH pellets containing EVOH-D, acetic acid, sodium salt, and phosphoric acid.

Synthesis Example 5: Synthesis of EVOH-E

Into a 100 L pressurized reactor equipped with a jacket, a stirrer, a nitrogen feed port, an ethylene feed port, and an initiator addition port, 38 kg of Vac and 4.2 kg of MeOH were charged, and an interior of the reactor was replaced with nitrogen by bubbling nitrogen for 30 min. Next, after the temperature in the reactor was adjusted to 120° C., ethylene was introduced such that the reactor pressure (ethylene pressure) became 7.92 MPa. Polymerization was started by adding 18.9 g of 2,2'-azobis(N-butyl-2-methylpropionamide) as the initiator. During the polymerization, the ethylene pressure was maintained at 7.92 MPa, and the polymerization temperature was maintained at 120° C. After 4 hrs when the conversion rate of VAc became 64.0%, the polymerization was stopped by cooling. The reactor was opened to allow elimination of ethylene, and thereafter the nitrogen gas was bubbled to complete the elimination of ethylene. Subsequently, after unreacted VAc was eliminated under a reduced pressure, a 20% by mass solution in MeOH was prepared by adding MeOH to EVAc.

Then, into a 300 L reactor equipped with a jacket, a stirrer, a nitrogen feed port, a reflux condenser, and a solution addition port, 100 kg of a 20% by mass EVAc solution in MeOH was charged. While nitrogen was blown into this solution, the temperature was elevated to 60° C., and a solution of sodium hydroxide with a concentration of 2 N in MeOH was added at a rate of 300 mL/min for 2 hrs. After completion of the addition of the sodium hydroxide solution in MeOH, an internal temperature of the system was maintained at 60° C., and while outflow of methyl acetate produced by the saponification reaction and MeOH was allowed outside the reactor, the saponification reaction was proceeded, with stirring of the mixture for 2 hrs. Subsequently, 5.8 kg of acetic acid was added to the mixture, whereby the saponification reaction was stopped.

Thereafter, with heating and stirring at 80° C., 75 L of ion exchanged water was added to allow outflow of MeOH from the reactor, and precipitation of the EVOH was permitted. Thus precipitated EVOH was collected by decantation, and was ground by a grinder. The EVOH powder thus obtained was charged into a 1 g/L aqueous acetic acid solution (bath ratio 20:a ratio of 20 L of the aqueous solution with respect to 1 kg of the powder) and washed with stirring for 2 hrs. The EVOH powder was deliquored and further, charged into a 1 g/L aqueous acetic acid solution (bath ratio 20) and washed with stirring for 2 hrs. Purification was conducted by repeating three times, an operation of: charging the EVOH powder into ion exchanged water (bath ratio 20):washing with stirring for 2 hrs; and carrying out deliquoring. Next, the EVOH powder was immersed with stirring for 4 hrs in 250 L of an aqueous solution containing 0.5 g/L acetic acid and 0.1 g/L sodium acetate, and then deliquored. Thereafter, drying at 60° C. for 16 hrs gave 10.1 kg of crude dry matter of the EVOH.

Into a 60 L mixing vessel equipped with a jacket, a stirrer, and a reflux condenser, 10 kg of the EVOH crude dry matter, 4 kg of water, and 11 kg of MeOH were charged, and dissolution was allowed by elevating the temperature to 85° C. This solution was extruded into a mixed liquid of water/MeOH=90/10, which had been cooled to −5° C., through a metal plate with a hole having a diameter of 4 mm to allow for precipitation in a strand shape, and this strand was cut into a pellet shape with a strand cutter to give water-containing pellets of the EVOH. As a result of a measurement using Halogen Moisture Analyzer "HR73" manufactured by Mettler Toledo, the moisture content of the water-containing pellets of the EVOH obtained was 52% by mass.

19.1 kg of the water-containing pellets of the EVOH obtained above was charged into a 1 g/L aqueous acetic acid solution (bath ratio 20) and washed with stirring for 2 hrs. The water-containing pellets were deliquored and further, charged into a 1 g/L aqueous acetic acid solution (bath ratio 20) and washed with stirring for 2 hrs. After deliquoring, the aqueous acetic acid solution was renewed and a similar operation was conducted. After washing with an aqueous acetic acid solution and then deliquoring, purification was conducted by repeating three times, an operation of: charging the water-containing pellets into ion exchanged water (bath ratio 20):washing with stirring for 2 hrs; and carrying out deliquoring, to give the water-containing pellets of the EVOH, which had been contained in the saponification reaction, having been eliminated. The water-containing pellets were charged into an aqueous solution (bath ratio 20) having a sodium acetate concentration of 0.510 g/L, an acetic acid concentration of 0.8 g/L, a phosphoric acid concentration of 0.04 g/L, and a boric acid concentration of 0.83 g/L, and were immersed therein while periodically stirring the mixture for 4 hrs. The pellets were deliquored, and dried at 80° C. for 3 hrs and then at 105° C. for 16 hrs, to give EVOH pellets containing EVOH-E, acetic acid, sodium salt, phosphoric acid, and boric acid.

Synthesis Example 6: Synthesis of EVOH-F

Into a 100 L pressurized reactor equipped with a jacket, a stirrer, a nitrogen feed port, an ethylene feed port, and an initiator addition port, 40.0 kg of VAc and 4.0 kg of MeOH were charged, and an interior of the reactor was replaced with nitrogen by bubbling nitrogen for 30 min. Next, after the temperature in the reactor was adjusted to 60° C., ethylene was introduced such that the reactor pressure (ethylene pressure) became 4.83 MPa, and polymerization was started by adding 18.8 g of 2,2'-azobis(2,4-dimethylvaleronitrile) as the initiator. During the polymerization, the ethylene pressure was maintained at 4.83 MPa, and the polymerization temperature was maintained at 60° C. After 4 hrs when the conversion rate of VAc became 50.4%, the polymerization was stopped by cooling. The reactor was opened to allow elimination of ethylene, and thereafter the nitrogen gas was bubbled to complete the elimination of ethylene. Subsequently, after unreacted VAc was eliminated under a reduced pressure, a 20% by mass solution in MeOH was prepared by adding MeOH to EVAc.

Then, into a 300 L reactor equipped with a jacket, a stirrer, a nitrogen feed port, a reflux condenser, and a solution addition port, 100 kg of a 20% by mass EVAc solution in MeOH was charged. While nitrogen was blown into this solution, the temperature was elevated to 60° C., and a solution of sodium hydroxide with a concentration of 2 N in MeOH was added at a rate of 300 mL/min for 2 hrs. After completion of the addition of the sodium hydroxide solution in MeOH, an internal temperature of the system was maintained at 60° C., and while outflow of methyl acetate produced by the saponification reaction and MeOH was allowed outside the reactor, the saponification reaction was proceeded, with stirring of the mixture for 2 hrs. Subsequently, 5.8 kg of acetic acid was added to the mixture, whereby the saponification reaction was stopped.

Thereafter, with heating and stirring at 80° C., 75 L of ion exchanged water was added to allow outflow of MeOH from the reactor, and precipitation of the EVOH was permitted. Thus precipitated EVOH was collected by decantation, and was ground by a grinder. The EVOH powder thus obtained was charged into a 1 g/L aqueous acetic acid solution (bath ratio 20:a ratio of 20 L of the aqueous solution with respect to 1 kg of the powder) and washed with stirring for 2 hrs. The EVOH powder was deliquored and further, charged into a 1 g/L aqueous acetic acid solution (bath ratio 20) and washed with stirring for 2 hrs. Purification was conducted by repeating three times, an operation of: charging the EVOH powder into ion exchanged water (bath ratio 20):washing with stirring for 2 hrs; and carrying out deliquoring. Next, the EVOH powder was immersed with stirring for 4 hrs in 250 L of an aqueous solution containing 0.5 g/L acetic acid and 0.1 g/L sodium acetate, and then deliquored. Thereafter, drying at 60° C. for 16 hrs gave 10.7 kg of crude dry matter of the EVOH.

Into a 60 L mixing vessel equipped with a jacket, a stirrer, and a reflux condenser, 10 kg of the EVOH crude dry matter, 4 kg of water, and 11 kg of MeOH were charged, and dissolution was allowed by elevating the temperature to 85° C. This solution was extruded into a mixed liquid of water/MeOH=90/10, which had been cooled to −5° C., through a metal plate with a hole having a diameter of 4 mm to allow for precipitation in a strand shape, and this strand was cut into a pellet shape with a strand cutter to give water-containing pellets of the EVOH. As a result of a measurement using Halogen Moisture Analyzer "HR73" manufactured by Mettler Toledo, the moisture content of the water-containing pellets of the EVOH obtained was 50% by mass.

18.7 kg of the water-containing pellets of the EVOH obtained above was charged into a 1 g/L aqueous acetic acid solution (bath ratio 20) and washed with stirring for 2 hrs. The water-containing pellets were deliquored and further, charged into a 1 g/L aqueous acetic acid solution (bath ratio 20) and washed with stirring for 2 hrs. After deliquoring, the aqueous acetic acid solution was renewed and a similar operation was conducted. After washing with an aqueous acetic acid solution and then deliquoring, purification was conducted by repeating three times, an operation of: charging the water-containing pellets into ion exchanged water (bath ratio 20):washing with stirring for 2 hrs; and carrying out deliquoring, to give the water-containing pellets of the EVOH, with catalyst residues, which had been contained in the saponification reaction, having been eliminated. The water-containing pellets were charged into an aqueous solution (bath ratio 20) having a sodium acetate concentration of 0.510 g/L, an acetic acid concentration of 0.8 g/L, a phosphoric acid concentration of 0.04 g/L, and a boric acid concentration of 0.25 g/L, and were immersed therein while periodically stirring the mixture for 4 hrs. The pellets were deliquored, and dried at 70° C. for 20 hrs in vacuo, to give EVOH pellets containing EVOH-F, acetic acid, sodium salt, phosphoric acid, and boric acid.

Synthesis Example 7: Synthesis of EVOH-G

Into a 100 L pressurized reactor equipped with a jacket, a stirrer, a nitrogen feed port, an ethylene feed port, and an initiator addition port, 40.0 kg of Vac and 14 kg of MeOH were charged, and an interior of the reactor was replaced with nitrogen by bubbling nitrogen for 30 min. Next, after the temperature in the reactor was adjusted to 50° C., ethylene was introduced such that the reactor pressure (ethylene pressure) became 3.93 MPa, and polymerization was started by adding 600 g of 2,2'-azobisisobutyronitrile ("AIBN" manufactured by Wako Pure Chemical Industries, Ltd.) as the initiator. During the polymerization, the ethylene pressure was maintained at 3.93 MPa, and the polymerization temperature was maintained at 50° C. After 4 hrs when the conversion rate of VAc became 50.4%, the polymerization was stopped by cooling. The reactor was opened to allow elimination of ethylene, and thereafter the nitrogen gas was bubbled to complete the elimination of ethylene. Subsequently, after unreacted VAc was eliminated under a reduced pressure, a 20% by mass solution in MeOH was prepared by adding MeOH to EVAc.

Then, into a 300 L reactor equipped with a jacket, a stirrer, a nitrogen feed port, a reflux condenser, and a solution addition port, 100 kg of a 20% by mass EVAc solution in MeOH was charged. While nitrogen was blown into this solution, the temperature was elevated to 60° C., and a solution of sodium hydroxide with a concentration of 2 N in MeOH was added at a rate of 300 mL/min for 2 hrs. After completion of the addition of the sodium hydroxide solution in MeOH, an internal temperature of the system was maintained at 60° C., and while outflow of methyl acetate produced by the saponification reaction and MeOH was allowed outside the reactor, the saponification reaction was proceeded, with stirring of the mixture for 2 hrs. Subsequently, 5.8 kg of acetic acid was added to the mixture, whereby the saponification reaction was stopped.

Thereafter, with heating and stirring at 80° C., 75 L of ion exchanged water was added to allow outflow of MeOH from the reactor, and precipitation of the EVOH was permitted. Thus precipitated EVOH was collected by decantation, and was ground by a grinder. The EVOH powder thus obtained was charged into a 1 g/L aqueous acetic acid solution (bath ratio 20:a ratio of 20 L of the aqueous solution with respect to 1 kg of the powder) and washed with stirring for 2 hrs. The EVOH powder was deliquored and further, charged into a 1 g/L aqueous acetic acid solution (bath ratio 20) and washed with stirring for 2 hrs. Purification was conducted by repeating three times, an operation of: charging the EVOH powder into ion exchanged water (bath ratio 20):washing with stirring for 2 hrs; and carrying out deliquoring. Next, the EVOH powder was immersed with stirring for 4 hrs in 250 L of an aqueous solution containing 0.5 g/L acetic acid and 0.1 g/L sodium acetate, and then deliquored. Thereafter, drying at 60° C. for 16 hrs gave 10.7 kg of crude dry matter of the EVOH.

Into a 60 L mixing vessel equipped with a jacket, a stirrer, and a reflux condenser, 10 kg of the EVOH crude dry matter, 4 kg of water, and 11 kg of MeOH were charged, and dissolution was allowed by elevating the temperature to 85° C. This solution was extruded into a mixed liquid of water/MeOH=90/10, which had been cooled to −5° C., through a metal plate with a hole having a diameter of 4 mm to allow for precipitation in a strand shape, and this strand was cut into a pellet shape with a strand cutter to give water-containing pellets of the EVOH. As a result of a measurement using Halogen Moisture Analyzer "HR73" manufactured by Mettler Toledo, the moisture content of the water-containing pellets of the EVOH obtained was 50% by mass.

18.7 kg of the water-containing pellets of the EVOH obtained above was charged into a 1 g/L aqueous acetic acid solution (bath ratio 20) and washed with stirring for 2 hrs. The water-containing pellets were deliquored and further, charged into a 1 g/L aqueous acetic acid solution (bath ratio 20) and washed with stirring for 2 hrs. After deliquoring, the aqueous acetic acid solution was renewed and a similar operation was conducted. After washing with an aqueous acetic acid solution and then deliquoring, purification was conducted by repeating three times, an operation of: charging the water-containing pellets into ion exchanged water (bath ratio 20):washing with stirring for 2 hrs; and carrying out deliquoring, to give the water-containing pellets of the EVOH, with catalyst residues, which had been contained in the saponification reaction, having been eliminated. The water-containing pellets were charged into an aqueous solution (bath ratio 20) having a sodium acetate concentration of 0.510 g/L, an acetic acid concentration of 0.8 g/L, a phosphoric acid concentration of 0.04 g/L, and a boric acid concentration of 0.25 g/L, and were immersed therein while periodically stirring the mixture for 4 hrs. The pellets were deliquored, and dried at 70° C. for 48 hrs, to give EVOH pellets containing EVOH-G, acetic acid, sodium salt, phosphoric acid, and boric acid.

Synthesis Example 8: Synthesis of Resin Composition (B) PP-A

One part by mass of maleic anhydride (hereinafter, may be abbreviated as "MAH", manufactured by Wako Pure Chemical Industries, Ltd.) and 0.25 parts by mass of 2,5-dimethyl-2,5-bis(tert-butylperoxy)hexyne-3 (trade name PERHEXYNE (registered trademark) 25B, manufactured by NOF Corporation) were blended into 100 parts by mass of polypropylene PP-1 (Random PP, manufactured by Prime Polymer Co., Ltd., MFR: 7 g/10 min; density: 0.910 g/cm$^3$), and the mixture was extruded using a twin-screw kneading machine (TEX-30, manufactured by The Japan Steel Works, Ltd., L/D: 40, with a vacuum vent being employed) at a cylinder temperature of 220° C. and a screw rotation speed 200 rpm, in a discharge amount of 80 g/min to give maleic anhydride-modified polypropylene (hereinafter, may be abbreviated as "MAH-PP-1"). MAH-PP-1 had a density of 0.915 g/cm$^3$.

MAH-PP-1 thus obtained was dissolved in xylene, and a resultant solution in xylene was poured into acetone to purify MAH-PP-1 by permitting reprecipitation. The amount of grafting of maleic anhydride was 0.7% by mass.

Next, 90 parts by mass of PP-1, 10 parts by mass of MAH-PP-1 produced as described above, and 1.7 parts by mass of a carbodiimide group-containing compound (trade name CARBODILITE (registered trademark) HMV-15CA, manufactured by Nisshinbo Chemical Inc., carbodiimide group equivalent: 278) were mixed, and the mixture was extruded using the twin-screw kneading machine at a cylinder temperature of 250° C. and a screw rotation speed of 200 rpm, in a discharge amount of 80 g/min to give a resin composition (B) PP-A.

The resin composition (B) PP-A thus obtained had MFR (230° C., load: 2.16 kg) of 3 g/10 min, and a density of 0.910 g/cm$^3$. It is to be noted that according to an FT-IR analysis, a peak (1,790 cm$^{-1}$) for maleic anhydride disappeared from the spectrum of the resin composition (B) PP-A, indicating that a reaction rate of MAH-PP-1 with the carbodiimide group-containing compound was 100%. The content of the basic nitrogen-containing group was, with respect to 100 g of the resin composition (B) PP-A, 13 mmol (calculated from the amount of charge).

Synthesis Example 9: Synthesis of Resin Composition (B) PE-A

One part by mass of MAH and 0.06 parts by mass of 2,5-dimethyl-2,5-bis(t-butylperoxy)hexane (trade name PERHEXA (registered trademark) 25B, manufactured by NOF Corporation) were blended into 100 parts by mass of linear-low density polyethylene PE-1 (LLDPE, manufactured by Prime Polymer Co., Ltd., MFR: 4.0, density: 0.922 g/cm$^3$), and the mixture was extruded using the twin-screw kneading machine at a cylinder temperature of 250° C. and a screw rotation speed 200 rpm, in a discharge amount of 100 g/min to give maleic anhydride-modified polyethylene (hereinafter, may be abbreviated as "MAH-PE-1"). MAH-PE-1 had a density of 0.925 g/cm$^3$.

MAH-PE-1 thus obtained was dissolved in xylene, and a resultant solution in xylene was poured into acetone to purify MAH-PE-1 by permitting reprecipitation. The amount of grafting of maleic anhydride was 0.96% by mass.

Next, 90 parts by mass of PE-1, 10 parts by mass of MAH-PE-1 produced as described above, and 1.7 parts by mass of CARBODILITE (registered trademark) HMV-15CA were mixed, and the mixture was extruded using the twin-screw kneading machine at a cylinder temperature of 250° C. and a screw rotation speed of 200 rpm, in a discharge amount of 80 g/min to give a resin composition (B) PE-A.

The resin composition (B) PE-A thus obtained had MFR (230° C., load: 2.16 kg) of 3 g/10 min, and a density of 0.922 g/cm$^3$. It is to be noted that according to an FT-IR analysis, a peak (1,790 cm$^{-1}$) for maleic anhydride disappeared from the spectrum of the resin composition (B) PE-A, indicating that a reaction rate of MAH-PE-1 with the carbodiimide group-containing compound was 100%. The content of the basic nitrogen-containing group was, with respect to 100 g of the resin composition (B) PE-A, 13 mmol (calculated from the amount of charge).

Synthesis Example 10: Synthesis of Resin Composition (B) PP-B 90 parts by mass of PP-1 and 10 parts by mass of MAH-PP-1 produced in Synthesis Example 8 as described above were mixed, and the mixture was extruded using the twin-screw kneading machine at a cylinder temperature of 250° C. and a screw rotation speed of 200 rpm, in a discharge amount of 80 g/min to give a resin composition (B) PP-B. The resin composition (B) PP-B thus obtained had MFR (230° C., 2.16 kg load) of 10 g/10 min, and a density of 0.910 g/cm$^3$.

(1) Quantitative Determination of Content and Degree of Saponification of Ethylene Unit The content and the degree of saponification of the ethylene unit in each EVOH obtained in the Synthesis Examples 1 to 7 were determined by $^1$H-NMR measurements. The EVOH pellets were dissolved in heavy DMSO containing tetramethylsilane as an internal standard substance, and trifluoroacetic acid in an appropriate amount was added thereto. The measurement was performed using a 500 MHz $^1$H-NMR ("GX-500" manufactured by JEOL, Ltd.) at 80° C.

Each signal on the $^1$H-NMR spectrum of the EVOH was assigned as in the following.
 0.7 to 1.9 ppm: methylene proton (4H) of the ethylene unit, methylene proton (2H) of the vinyl alcohol unit, methylene proton (2H) of the vinyl acetate unit
 1.9 to 2.1 ppm: methyl proton (3H) of the vinyl acetate unit
 3.1 to 4.2 ppm: methine proton (1H) of the vinyl alcohol unit According to the above assignment, an integrated value of 0.7-1.9 ppm was defined as "x", an integrated value of 1.9-2.1 ppm was defined as "y", and an integrated value of 3.1-4.2 ppm was defined as "z". Then, the content "a" (mol %) and the degree of saponification "b" (mol %) of the ethylene unit were calculated according to the following equation.

$$a = \frac{3x - 2y - 6z}{3x + 2y + 6z} \times 100$$

$$b = \frac{3z}{y + 3z} \times 100$$

The content, and the degree of saponification of the ethylene unit determined by the above method are shown in Table 1

(2) Quantitative Determination of Carboxy Group and Lactone Ring of EVOH

The content of the carboxy group and the lactone ring, and the content of the lactone ring in each EVOH obtained in the Synthesis Examples 1 to 7 were determined by $^1$H-NMR measurements. The EVOH pellets were dissolved in heavy water/heavy methanol solvent (heavy water:heavy methanol=4:6) containing tetramethylsilane as an internal standard substance, and the measurement was performed using a 500 MHz $^1$H-NMR ("GX-500" manufactured by JEOL, Ltd.) at 80° C.

Each signal on the $^1$H-NMR spectrum of the EVOH was assigned as in the following.
- 0.7 to 1.9 ppm: methylene proton (4H) of the ethylene unit, methylene proton (2H) of the vinyl alcohol unit, methylene proton (2H) of the vinyl acetate unit
- 2.2 to 2.5 ppm: methylene proton (2H) adjacent to the carboxy group, methylene proton (1H) of one of two divided signals of methylene protons, not being adjacent to the carbonyl group of the lactone ring
- 2.5 to 2.65 ppm: methylene proton (2H) adjacent to the carbonyl group of the lactone ring According to the above assignment, an integrated value of 0.7-1.9 ppm was defined as "x", an integrated value of 2.2 to 2.5 ppm was defined as "y", an integrated value of 2.5 to 2.65 ppm was defined as "z", and the content of the ethylene unit was defined as "a" (mol %). Then, the content (c: mol %) of the carboxy group and the lactone ring, and the content (d: mol %) of the lactone ring, both with respect to the total amount of the ethylene unit, the vinyl alcohol unit, and the vinyl acetate unit were calculated according to the following equation.

$$c = \frac{(a+100)(2y+z)}{200x+(a+100)(2y+z)} \times 100$$

$$d = \frac{2(a+100)z}{200x+(a+100)(2y+z)} \times 100$$

The content of the carboxy group and the lactone ring, and the content of the lactone ring determined by the above method are shown in Table 1.

(3) Sodium Salt Content, Phosphoric Acid Content, and Boric Acid Content in EVOH Pellets The EVOH pellets obtained by the Synthesis Examples 1 to 7 were placed in an amount of 0.5 g into Teflon (registered trademark) pressure vessel, respectively, and thereto, 5 mL of conc. nitric acid was added and decomposition was permitted at room temperature for 30 min. Thirty minutes later, a lid was attached and decomposition was allowed by heating with a wet decomposition system ("MWS-2" manufactured by Actac Project Services Corporation) at 150° C. for 10 min and then at 180° C. for 5 min, followed by cooling to room temperature. This treatment liquid was transferred to a 50 mL volumetric flask (made of TPX) and diluted to fill up with pure water. This solution was subjected to an analysis on metals contained therein with an ICP emission spectrometer ("OPTIMA 4300 DV" manufactured by PerkinElmer, Inc.) to determine the content of a sodium element, a phosphorus element, and boric acid. All EVOH pellets had a sodium salt content, in terms of the sodium element equivalent, of 90 to 110 ppm, and a phosphoric acid content, in terms of the phosphate radical equivalent, of 35 to 45 ppm. In addition, the results of the measurement of the boric acid content are shown in Table 1.

(4) Measurement of Melt Flow Rate of EVOH

The EVOH pellets obtained by the Synthesis Examples 1 to 7 were packed into a cylinder, having an internal diameter of 9.55 mm and a length of 162 mm, of Melt Indexer L244 (manufactured by Takara Kogyo K. K.) and melted at 190° C., and then a load was applied evenly to the melted resin using a plunger having a weight of 2,160 g and a diameter of 9.48 mm. A resin amount extruded per unit time (g/10 minutes) from an orifice having a diameter of 2.1 mm provided at the center of the cylinder was measured, and this value was defined as the melt flow rate. However, as for EVOH-B and EVOH-D, values measured as the melt flow rate at 210° C., 220° C., and 230° C. were plotted on a semi-log graph with the abscissa representing reciprocal numbers of absolute temperatures, and with the ordinate (logarithmic scale) representing the melt flow rates; and extrapolating to 190° C. The results of the measurement are shown in Table 1.

(5) Measurement of Melt Flow Rate of Resin Composition (B)

The melt flow rate of each of the resin compositions (B) obtained by the Synthesis Examples 8 to 10 was measured in accordance with ASTM D1238, at 230° C. under a load of 2.16 kg. The results of the measurement are shown again in Table 2.

(6) Density of Resin Composition (B)

The density of each of the resin compositions (B) obtained by the Synthesis Examples 8 to 10 was measured in accordance with JIS K7112. The results of the measurement are shown again in Table 2.

(7) Content of Basic Nitrogen-Containing Group

The content of the basic nitrogen-containing group in each of the resin compositions (B) obtained by the Synthesis Examples 8 and 9 was calculated from the amount of charge. The results of the calculation are shown again in Table 2.

(8) Amount of Grafting of Maleic Anhydride

The amount of grafting of maleic anhydride in the maleic anhydride-modified polyethylene and the maleic anhydride-modified polypropylene used in the Synthesis Examples 8 to 10 was measured by the following method using FT-IR.

After heat press sheets were produced from the samples at 250° C. for 3 min, an infrared absorption spectrum around 1,790 cm$^{-1}$ was measured by a transmission method using an infrared spectrophotometer (model FT-IR410, manufactured by JASCO Corporation). The measurement conditions involved an optical resolution of 2 cm$^{-1}$, and a cumulative number of 32.

(9) Reaction Rate (%) of Maleic Anhydride-Modified Polyolefin (x) with Compound (y) Having Basic Nitrogen-Containing Group In regard to the reaction rate (%) of the maleic anhydride-modified polyolefin (x) with the compound (y) having the basic nitrogen-containing group in the Synthesis Examples 8 and 9, since a peak (1,790 cm$^{-1}$) derived from maleic anhydride was not found in the resin composition (B) as measured by FT-IR, the reaction rate being 100% was ascertained.

Example 1

Production of Multilayer Sheet

As shown in Table 3, pellets of: the EVOH (EVOH-A) to constitute the layer (A); the resin composition (B) (PP-A) to constitute the layer (B); and the polyolefin (PP) to constitute the layer (C) were charged into separate extruders, and a multilayer sheet (multilayer structure) having a five-layer structure of layer (C) (PP)/layer (B) (PP-A)/layer (A) (EVOH-A)/layer (B) (PP-A)/layer (C) (PP) was obtained with a coextrusion sheet molding apparatus for a construction of five layers from three types. For the extrusion molding: the polyolefin was subjected to an extruder equipped with a monoaxial screw having a diameter of 65 mm with L/D=22 at a temperature of 230° C.; the EVOH was subjected to an extruder equipped with a monoaxial screw having a diameter of 40 mm with L/D=26 at a temperature of 220° C.; and the modified polyolefin was subjected to an extruder equipped with a monoaxial screw having a diameter of 40 mm with L/D=26 at a temperature of 240° C., and operated with a feed block type die (width: 600 mm) at 260° C.

Film Thickness of Each Layer of Multilayer Sheet

A cross section for observation was obtained by slicing with a microtome to give a cross section of the multilayer sheet obtained. This sample was placed on a microscope slide and fixed with a cover glass, and then the EVOH was stained with an aqueous iodine solution. The thickness of each layer was measured by a microscopic observation. An averaged value of the measurement results (n=10) of each layer was defined as the average thickness. The results of the measurement are shown in Table 3.

Initial Interlayer Adhesive Force

Peeling of the layer (A) and the layer (B) of the multilayer sheet obtained was permitted at the interface under a condition involving a temperature of 23° C. and 50% RH, and the peel strength between the layer (A) and the layer (B) was measured by T-peel conducted using an autograph (strain rate: 250 mm/min) manufactured by Shimadzu Corporation. This peel strength was defined as an initial adhesive force. The results of the measurement are shown in Table 3.

Hot Water Resistance, Acid Resistance, and Alkali Resistance

The multilayer sheet obtained was immersed in hot water with a temperature of 80° C. On every six days, the moisture attached to the surface of the sheet after the immersion was wiped off, and T-peel was conducted using the autograph (strain rate: 250 mm/min) under a condition involving a temperature of 23° C. and 50% RH to measure the peel strength between the layer (A) and the layer (B). The number of days until the peel strength of less than 5 N/15 mm was found first was employed as a marker of the hot water resistance. Furthermore, for markers of the acid resistance and the alkali resistance employed, the immersion was carried out with, in place of hot water, an aqueous sulfuric acid solution (pH=2) as the acid, or an aqueous sodium hydroxide solution (pH=12) as the alkali, and the peel strength between the layer (A) and the layer (B) was each measured in a similar manner for each case. The results of the measurement are shown in Table 3.

Examples 2 to 12, Comparative Examples 1 to 3

Multilayer sheets (multilayer structures) were obtained in a similar manner to Example 1 except that the type of the resin composition (resin) to constitute each layer, and the average thickness of each layer were as shown in Table 3. The results of the various evaluations of the multilayer sheets obtained are shown in Table 3.

It is to be noted that "PP" in Table 3 indicates a layer constituted from polypropylene "Novatec PP (EA7AD)" manufactured by Japan Polypropylene Corporation, and "PE" indicates a layer constituted from polyethylene "Novatec LL (UF943)" manufactured by Japan Polypropylene Corporation.

TABLE 1

|  | Content of carboxy group and lactone ring [mol %] | Content of lactone ring [mol %] | Content of ethylene unit [mol %] | Degree of saponification [mol %] | MFR [g/10 min, 190° C.] | Content of boric acid [ppm] |
| --- | --- | --- | --- | --- | --- | --- |
| EVOH-A | 0.20 | 0.11 | 38.2 | 99.9 | 2.0 | 800 |
| EVOH-B | 0.10 | 0.05 | 20.0 | 99.5 | 1.2 | 0 |
| EVOH-C | 0.30 | 0.15 | 52.0 | 99.9 | 2.2 | 1,800 |
| EVOH-D | 0.05 | 0.02 | 24.3 | 99.9 | 1.1 | 0 |
| EVOH-E | 0.50 | 0.28 | 50.0 | 99.9 | 1.8 | 2,600 |
| EVOH-F | 0.20 | 0.06 | 38.2 | 99.9 | 2.0 | 800 |
| EVOH-G | 0.20 | 0.15 | 38.2 | 99.9 | 2.0 | 800 |

TABLE 2

| Resin composition (B) | Functional group | Content of functional group (mmol/100 g) | MFR [g/10 min, 230° C.] | Density [g/cm³] |
| --- | --- | --- | --- | --- |
| PP-A | imino group (basic nitrogen-containing group) | 13 | 3 | 0.910 |
| PE-A | imino group (basic nitrogen-containing group) | 13 | 3 | 0.922 |
| PP-B | maleic anhydride group | 0.7 | 10 | 0.910 |

TABLE 3

|  | Layer structure | Average thickness of each layer | Initial adhesive force [N/15 mm] | Hot water resistance [days] | Acid resistance [days] | Alkali resistance [days] |
| --- | --- | --- | --- | --- | --- | --- |
| Example 1 | PP/PP-A/EVOH-A/PP-A/PP | 750/50/80/50/750 | 262 | 360< | 360< | 280 |
| Example 2 | PP/PP-A/EVOH-B/PP-A/PP | 750/50/80/50/750 | 187 | 360< | 360< | 215 |
| Example 3 | PP/PP-A/EVOH-C/PP-A/PP | 750/50/80/50/750 | 214 | 360< | 360< | 260 |

TABLE 3-continued

|  | Layer structure | Average thickness of each layer | Initial adhesive force [N/15 mm] | Hot water resistance [days] | Acid resistance [days] | Alkali resistance [days] |
|---|---|---|---|---|---|---|
| Example 4 | PP/PP-A/EVOH-A/PP-A/PP | 1,500/80/160/80/1,500 | 248 | 360< | 360< | 270 |
| Example 5 | PP/PP-A/EVOH-A/PP-A/PP | 200/50/80/50/200 | 151 | 360< | 360< | 180 |
| Example 6 | PP/PP-A/EVOH-A/PP-A/PP | 750/20/80/20/750 | 131 | 360< | 360< | 160 |
| Example 7 | PE/PE-A/EVOH-A/PE-A/PE | 750/50/80/50/750 | 260 | 360< | 360< | 280 |
| Example 8 | PP/PE-A/EVOH-A/PE-A/PP | 750/100/80/100/750 | 224 | 360< | 360< | 255 |
| Example 9 | PP/PE-A/EVOH-A/PE-A/PP | 750/50/150/50/750 | 242 | 360< | 360< | 270 |
| Example 10 | PP/PE-A/EVOH-A/PE-A/PP | 750/50/20/50/750 | 138 | 360< | 360< | 180 |
| Example 11 | PP/PP-A/EVOH-F/PP-A/PP | 750/50/80/50/750 | 192 | 360< | 360< | 225 |
| Example 12 | PP/PP-A/EVOH-G/PP-A/PP | 750/50/80/50/750 | 224 | 360< | 360< | 265 |
| Comparative Example 1 | PP/PP-A/EVOH-D/PP-A/PP | 750/50/80/50/750 | 49 | 360< | 360< | 135 |
| Comparative Example 2 | PP/PP-A/EVOH-E/PP-A/PP | 750/50/80/50/750 | 192 | 180 | 110 | 60 |
| Comparative Example 3 | PP/PP-B/EVOH-A/PP-B/PP | 750/50/80/50/750 | 102 | 125 | 85 | 40 |

As shown in Table 3, the initial adhesive force of each of the multilayer sheets (multilayer structures) of Examples 1 to 12 exceeded 130 N/15 mm, indicating strong initial adhesive force being provided. Moreover, each of the multilayer sheets (multilayer structures) of Examples 1 to 12 was able to maintain sufficient interlayer adhesive force for a long period of time, even in an environment with hot water, the acid or the alkali.

Example 13: Installation and Evaluation of System for Preventing Diffusion of Hazardous Substances, with Use of Radon Barrier Sheet The multilayer sheet obtained in Example 1 was cut into two pieces of 75 cm square. The two multilayer sheets were joined via a double-stick tape, and an overlapping portion of one face was covered with a single-stick tape.

Hot Water-Immersion Treatment

The two multilayer sheets thus joined (radon barrier sheet) were immersed in hot water with a temperature of 80° C. for 360 days.

Acid-Immersion Treatment

The multilayer sheets similarly prepared were immersed in aqueous sulfuric acid solution (pH=2) with a temperature of 80° C. for 200 days, instead of being immersed in hot water with a temperature of 80° C. for 360 days.

Alkali-Immersion Treatment

The multilayer sheets similarly prepared were immersed in an aqueous sodium hydroxide solution (pH=12) with a temperature of 80° C. for 200 days, instead of being immersed in hot water with a temperature of 80° C. for 360 days.

Installation of Radon Gas Barrier Sheet

Radon gas-containing garbage was placed on concrete, and a system for preventing diffusion of hazardous substances was installed by overlaying thereon the multilayer sheet which had been subjected to each treatment described above, followed by putting 1 kg weights on four corners and a center portion, respectively, of the sheet. A rubber tape having a width of 10 cm was used as the double-stick tape, and an aluminum tape having a width of 10 cm was used as the single-stick tape.

Detection of Radon Gas

In an attempt to detect the radon gas, a radon gas detector was used in the air 20 cm above the weights. As the radon gas detector, "Radon Scout Home," manufactured by MEASURE WORKS Corporation, was used. As a result, the radon gas was not detected in any case of the multilayer sheets which had been subjected to the treatments.

Example 14: Installation and Evaluation of Landfill Geomembrane

In a similar manner to Example 8 except that methane gas-generating garbage was used in place of the radon gas-containing garbage, a system for preventing diffusion of hazardous substances was installed by using the multilayer sheets which had been subjected to each immersion treatment.

Detection of Methane Gas

In an attempt to detect the methane gas, a methane gas detector was used in place of the radon gas detector. As the methane gas detector, "methane gas indicator RI-415" manufactured by RIKEN KEIKI Co., Ltd., was used. As a result, the methane gas was not detected in any case of the multilayer sheets which had been subjected to the treatments.

Example 15: Installation of Multilayer Pipe

By using the resin constituting the multilayer sheet of Example 1 shown in Table 3, pellets of: EVOH to constitute the layer (A); the resin composition (B) to constitute the layer (B); and the polyolefin to constitute the layer (C) were charged into separate extruders, and a multilayer pipe having a five layer structure of layer (C)/layer (B)/layer (A)/layer (B)/layer (C), with a length of 30 m, was obtained by feeding respective melted resins, which had been melted by the extruder, into a circular die for a construction of five layers from three types, followed by coextrusion from the circular die. For the extrusion molding: the polyolefin was subjected to an extruder equipped with a monoaxial screw having a diameter of 65 mm with L/D=22 at a temperature of 230° C.; the EVOH was subjected to an extruder equipped with a monoaxial screw having a diameter of 40 mm with L/D=26 at a temperature of 220° C.; and the resin composition (B) was subjected to an extruder equipped with a monoaxial screw having a diameter of 40 mm with L/D=26 at a temperature of 240° C., and operated with a circular die at 260° C. A thus resulting multilayer pipe had an internal diameter of 80 mm and a wall thickness of 1.75 mm, and the average thickness of each layer was: layer (C)/layer (B)/layer (A)/layer (B)/layer (C)=800 μm/50 μm/50 μm/50 μm/800 μm.

Evaluation of Appearance

The multilayer pipe thus obtained was cut into three equal parts along a longitudinal direction, and 80° C. hot water was passed through inside one multilayer pipe for 360 days. As a result of visual verification of the multilayer pipe after the water passing, appearance defects, such as peeling of the layer, were not identified. Moreover, an aqueous sulfuric acid solution (pH=2), or an aqueous sodium hydroxide solution (pH=12) was passed through each of other two multilayer pipes for 200 days. As a result of visual verification of the multilayer pipe after the passing of the aqueous solution, appearance defects, such as peeling of the layer, were not identified in any of the multilayer pipes.

INDUSTRIAL APPLICABILITY

The multilayer structure of the embodiment of the present invention can be used for packaging materials, containers, sheets, landfill geomembranes, pipes, and the like.

The invention claimed is:

1. A multilayer structure comprising:
one or a plurality of layer (A) constituted from a resin composition (A) comprising an ethylene-vinyl alcohol copolymer (a) as a principal component; and
one or a plurality of layer (B) constituted from a resin composition (B) comprising a modified polyolefin (b) which comprises a basic nitrogen-containing group, wherein the modified polyolefin (b) is prepared by reacting a polyolefin comprising a maleic anhydride group with a reactive compound having a basic nitrogen-containing group,
wherein
at least one of the layer (A) and at least one of the layer (B) are directly laminated,
the ethylene-vinyl alcohol copolymer (a) comprises at least one of a carboxy group and a lactone ring,
a total amount of the carboxy group and the lactone ring with respect to a total amount of an ethylene unit, a vinyl alcohol unit, and a vinyl ester unit of the ethylene-vinyl alcohol copolymer (a) is 0.08 mol % or more and 0.4 mol % or less, and
in the resin composition (B), a peak derived from maleic anhydride is not found using FT-IR.

2. The multilayer structure according to claim 1, further comprising one or a plurality of layer (C) constituted from a resin composition (C) comprising, as a principal component, a polyolefin (c) which does not substantially comprise a basic nitrogen-containing group.

3. The multilayer structure according to claim 1, further comprising one or a plurality of layer (D) constituted from a resin composition (D) comprising: an ethylene-vinyl alcohol copolymer (a') which comprises at least one of a carboxy group and a lactone ring; and a modified polyolefin (b') which comprises a basic nitrogen-containing group.

4. The multilayer structure according to claim 1, comprising a three-layer structure comprising the layer (B), the layer (A), and the layer (B), being directly laminated in this order.

5. The multilayer structure according to claim 1, comprising a five-layer structure comprising a layer (X), the layer (B), the layer (A), the layer (B), and the layer (X), being directly laminated in this order,
wherein two layers (X) are each independently:
a layer (C) constituted from a resin composition (C) comprising, as a principal component, a polyolefin (c) which does not substantially comprise a basic nitrogen-containing group; or
a layer (D) constituted from a resin composition (D) comprising: an ethylene-vinyl alcohol copolymer (a') which comprises at least one of a carboxy group and a lactone ring; and a modified polyolefin (b') which comprises a basic nitrogen-containing group.

6. The multilayer structure according to claim 1, wherein
a total average thickness of the one or a plurality of layer (A) is 30 μm or more,
a total average thickness of the one or a plurality of layer (B) is 50 μm or more, and
a total average thickness of the multilayer structure is 750 μm or more.

7. The multilayer structure according to claim 1, wherein the multilayer structure has a peel strength between layer (A) and layer (B) of 5 N/15 mm or greater after immersion in water at a temperature of 80° C. for more than 360 days.

8. The multilayer structure according to claim 1, wherein the multilayer structure has a peel strength between layer (A) and layer (B) of 5 N/15 mm or greater after immersion in an aqueous sulfuric acid solution at a pH of 2 for more than 360 days.

9. The multilayer structure according to claim 1, wherein the multilayer structure has a peel strength between layer (A) and layer (B) of 5 N/15 mm or greater after immersion in an aqueous sodium hydroxide solution at a pH of 12 for from 160 to 280 days.

10. The multilayer structure according to claim 1, wherein the multilayer structure has an initial adhesive force of from 131 to 262 N/15 mm.

11. The multilayer structure according to claim 1, wherein the multilayer structure does not form a pipe.

12. The multilayer structure according to claim 1, wherein the reactive compound having a basic nitrogen-containing group is a carbodiimide.

13. The multilayer structure according to claim 1, wherein the basic nitrogen-containing group comprises at least one of an amino group and an imino group.

14. The multilayer structure according to claim 13, wherein the basic nitrogen-containing group comprises an imino group.

15. A sheet for preventing diffusion of hazardous substances, the sheet comprising the multilayer structure according to claim 1.

16. A landfill geomembrane comprising the multilayer structure according to claim 1.

17. A multilayer pipe comprising the multilayer structure according to claim 1.

18. A method for producing multilayer structure of claim 1, the method comprising coextruding using: a resin composition (A) comprising an ethylene-vinyl alcohol copolymer (a) as a principal component; and a resin composition (B) comprising a modified polyolefin (b) which comprises a basic nitrogen-containing group, such that at least one layer (A) formed from the resin composition (A) and at least one layer (B) formed from the resin composition (B) are directly laminated,
wherein
the ethylene-vinyl alcohol copolymer (a) comprises at least one of a carboxy group and a lactone ring, and
a total amount of the carboxy group and the lactone ring with respect to a total amount of an ethylene unit, a vinyl alcohol unit, and a vinyl ester unit of the ethylene-vinyl alcohol copolymer (a) is 0.08 mol % or more and 0.4 mol % or less.

* * * * *